United States Patent [19]
Kukol

[11] Patent Number: 5,628,016
[45] Date of Patent: May 6, 1997

[54] SYSTEMS AND METHODS AND IMPLEMENTING EXCEPTION HANDLING USING EXCEPTION REGISTRATION RECORDS STORED IN STACK MEMORY

[75] Inventor: Peter Kukol, Aptos, Calif.

[73] Assignee: Borland International, Inc., Scotts Valley, Calif.

[21] Appl. No.: 262,072

[22] Filed: Jun. 15, 1994

[51] Int. Cl.$^6$ ........................................................ G06F 9/45
[52] U.S. Cl. .................................... 395/704; 395/705
[58] Field of Search ............................................... 395/700

[56] References Cited

PUBLICATIONS

Ellis, M.A. and Stroustrup, B., "The Annotated C++ Reference Manual," AT&T BellLaboratories, Murray Hill, NJ, 1990, Chapter 15 Exception Handling, pp. 353–367.
Christian, K., Power Programming: "Making Exceptions With C++," PC Magazine, Dec. 21, 1993, pp. 311–320.
Plamondon, J., "Catch & Throw," Windows Tech Journal, Apr. 1992, pp. 22–27.
Wong et al., "Exception Handling in C++ Without Language Extension," TENCON '93—1993 IEEE Region 10 Conf. on 'Computer, Communication . . . , IEEE/IEE Pub, 1993, pp. 411–414.
Cameron, D., Faust, P., Lenkov, D. and Mehta, M., *A Portable Implementation of C++ Exception Handling*, Hewlett–Packard California Language Laboratory, C++ Technical Conference, USENIX Association, pp. 225–243 Oct. 10–13, 1992.

Kiyooka, G., *Getting a Handle on NT*, Byte, May 1993, pp. 229–230.
Reed, D., *Exceptions: Pragmatic Issues with a New Language Feature*, C++ Report, Oct. 1993, pp. 39–44.
Winroth, H. and Rendahl, M., *Exception Handling in C*, The C Users Journal, Oct. 1993, pp. 33–46.
Niezgoda, S., Holt, L. and Wojciech, D., *NT's Structured Exception Handling*, Byte, Nov. 1993, pp. 317–322.

*Primary Examiner*—Alvin Oberley
*Assistant Examiner*—Peter J. Corcoran, III
*Attorney, Agent, or Firm*—John A. Smart; Michael J. Ritter

[57] ABSTRACT

A development system having a compiler that allows programmers and software developers to more efficiently develop compiled applications with runtime exception handling support is described. The compiler implements methods for handling of exceptions, which may occur during runtime execution of the program. In an exemplary embodiment, the system of the present invention registers exception handling information (e.g., an Exception Registration Record) with the underlying operating system, during execution of prolog code for each function (or other discrete section of code). The method is implemented so that the Exception Registration Record (ERR) resides at the bottom of the stack (or top of stack, for stack-based systems whose system stack grows upward) so that the information is positioned at one end of the stack during execution of the function. In this manner, the method allows the system of the present invention to readily and efficiently register an exception handler with the operating system, by merely executing a series of efficient machine instructions for pushing data members of the ERR onto the stack (including "pushing" the value of zero for data members which are to be cleared).

40 Claims, 21 Drawing Sheets

FUNCTION PROLOG:

EXCEPTIONREGISTRATIONRECORD   err;

<initialize translator-defined 'err' fields> err.handler = _ExceptionHandler;    ←— 310
    err.prevErr = _ExceptionList;
            _ExceptionList = &err;  ←—
                             320

FUNCTION EPILOG:

_ExceptionList = err.prevErr;   ←— 330

```
struct CXtable
{
    void      *          exceptSpec;      ← 401
    unsigned             ERRstackOffs;    ← 403

CXentry              entries[];
};
```

```
struct CXentry
{
    unsigned short   outerOffs;      ← 411
    unsigned short   contextKind;    ← 413

// other optional fields may follow
};
```

*FIG. 4*

CONSTANT FILTER EXPRESSIONS

```
struct CXentryExceptConst
{
        unsigned short   outerOffs;
        unsigned short   contextKind;

unsigned         filterValue;
        void    *        handlerAddress;
};
```

NON-CONSTANT FILTER EXPRESSIONS

```
struct CXentryExceptExpr
{
        unsigned short   outerOffs;
        unsigned short   contextKind;

int              (*filterExprPtr)(void);
        void    *        handlerAddress;
};
```

```
                        901
    void f()        (
    {               )            910
       if (setjmp( jmp ) ≠ 0)
       {
          try { ... } finally { ... }
       }   ⌣905                  ⌣908
       else
       {
          ...
       }
    }
```

FIG. 9

```
struct CXentryCPPtryCatch
{
    unsigned short    outerOffs_try;
    unsigned short    contextKind_try;
    HTD       *       catchHandlerTable;

unsigned short    outerOffs_catch;
    unsigned short    contextKind_catch;
};
```

*FIG. 11*

```
struct HTD
{
    unsigned     HTDargAddr;
    unsigned     HTDargSize;

HD           HTDtable[];
};

struct HD
{
    void    *    HDhndPtr;      ~1211
    tpdscPtr     HDtypeID;      ~1213
    unsigned     HDflags;       ~1215
    void    *    HDcctrAddr;    ~1217
    unsigned     HDcctrMask;    ~1219
};
```

*FIG. 12*

```
1310 ─→  try
         {
             try_code;
         } catch(tp1 arg1)
         {
             catch1_code;
         } catch(tp2 arg2)
         {
             catch2_code;
         }
```

```
1300

1321 ~  <set current context for try/catch>;
    1323 ~  try_code;
    1325 ~  <reset current context to outer context>;
    1327 ~  goto catch_done;
    catch1_block:
                catch1_code;
    1333 ~  goto catch_cleanup;
    catch2_block:
                catch2_code;                        ~ 1335
    catch_cleanup:
                _CatchCleanup();
    catch_done:                                     ~ 1329
```
} 1320

FIG. 13

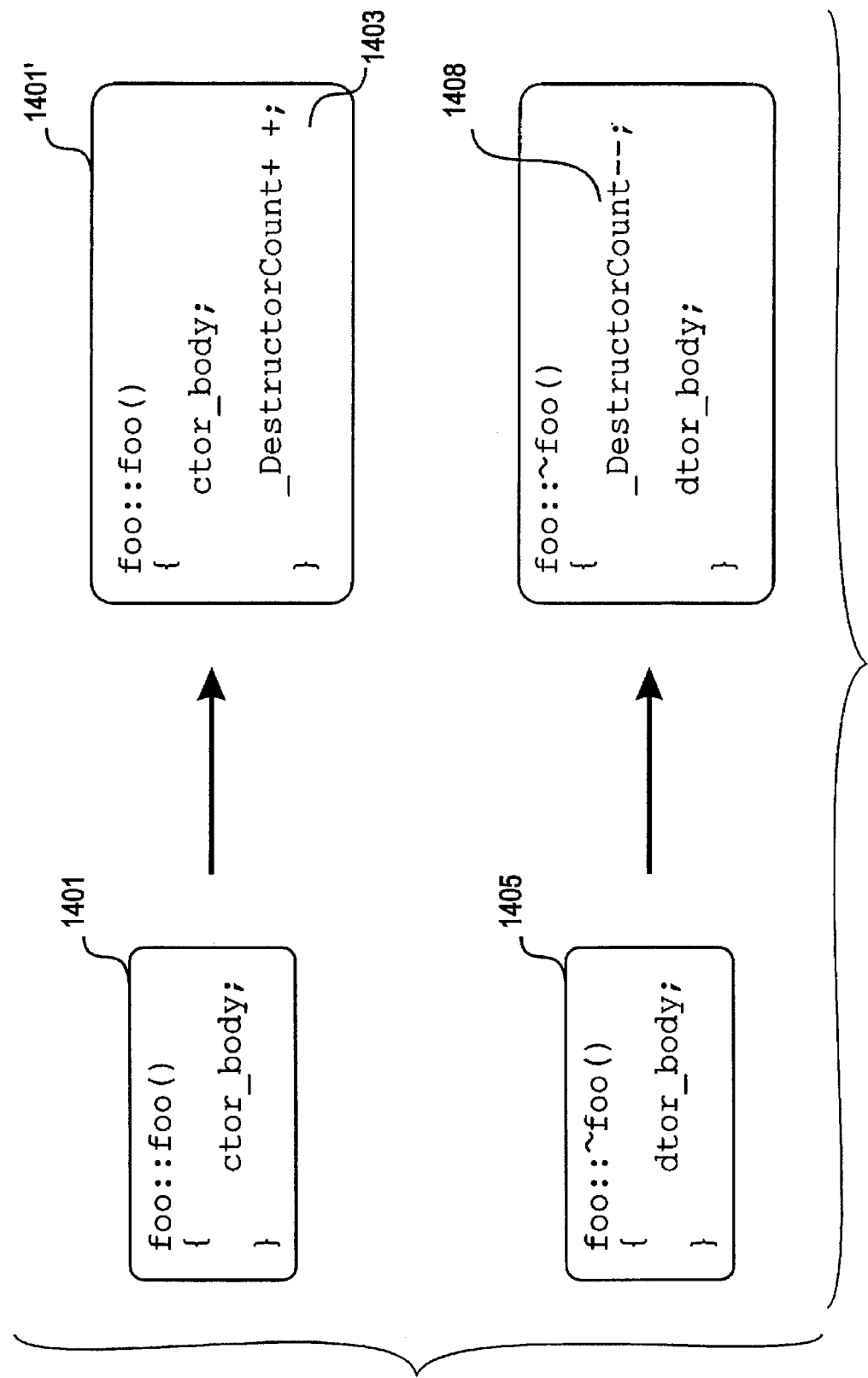

```
struct CXentryCPPdtc
{
    unsigned short  outerOffs;
    unsigned short  contextKind;

unsigned        relativeDtorCount;
    DTVT    *       cleanupVarTableAddr;
};
```

1500

```
struct DTVT
{
    tpidPtr     varType;      ~1551
    unsigned    varFlags;     ~1553
    unsigned    varOffset;    ~1555
};
```

```
void func()
{
    code1;
    foo var1;      // 1601
    code2;
    foo var2;      // 1603
    code3;
    foo var3;      // 1605
    code4;
}
```
1600

```
void func()
{
    ExceptionRegistrationRecord ERR;            // 1610

ERR.initDTC = DestructorCount;              // 1611
    establish handler(&ERR);                    // 1612
    ERR.currentContext = <auto cleanup context>; // 1613 code1;
    var1.foo();    // increments _DestructorCount
    code2;
    var2.foo();    // increments _DestructorCount    } 1615
    code3;
    var3.foo();    // increments _DestructorCount
    code4;

var3. foo();   // decrements _DestructorCount
    var2. foo();   // decrements _DestructorCount    } 1618
    var1. foo();   // decrements _DestructorCount unhook_handler();
}
```
1600'

FIG. 16

SYSTEMS AND METHODS AND IMPLEMENTING EXCEPTION HANDLING USING EXCEPTION REGISTRATION RECORDS STORED IN STACK MEMORY

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to systems and methods for increasing the reliability and improving the behavior of software programs. More particularly, the present invention relates to exception-handling systems and methods which assist software developers in the task of ensuring that programs operative on digital computers can recover from exceptions (also known as runtime errors).

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," that is, the low-level, minute instructions for performing specific tasks—the sequence of ones and zeros that are interpreted as specific instructions by the computer's microprocessor. Since machine language or machine code is the only language computers actually understand, all other programming languages represent ways of structuring "human" language so that humans can get computers to perform specific tasks.

While it is possible for humans to compose meaningful programs in machine code, practically all software development today employs one or more of the available programming languages. The most widely-used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program written in the high-level language is called the "source code" or source program. The ultimate output of the compiler is an "object module," which includes instructions for execution by a target processor. Although an object module includes code for instructing the operation of a computer, the object module itself is not in a form which may be directly executed by a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .exe file) which, after testing and quality assurance, is passed to the user with appropriate installation and usage instructions.

Development of programs is largely a trial and error process. Errors that emerge from this program development cycle can be divided into three broad classes: compile-time errors, linkage errors, and runtime errors. Proper development methodologies and quality controls will remove both compile-time errors (such as syntax and format violations) and linkage errors (such as library and global naming inconsistencies), but runtime errors are less amenable to systematic elimination. Indeed, the supreme importance of runtime errors stems from the fact that they are usually discovered by, and provide major frustration to, the end user. Unless handled properly, runtime errors simply abort (terminate) execution, leaving the system in a questionable state and the user uncertain as to what went wrong and what to do next.

There are many reasons for the intractability of the runtime error problem. First, it is difficult to predict every user action during program execution. Although the conscientious programmer guides the user with helpful menus and prompts, and aims to insert code that checks the validity of each user response, in practice, considering the complexities of current graphical user interfaces, it remains a major programming challenge to anticipate and respond to arbitrary user input.

Second, it is difficult, and often impossible, to predict the availabilty of the diverse hardware and software resources required as program execution unfolds. For instance, the running program might request RAM (random access memory) and disk storage allocations at diverse points of its execution, in the absence of which the program cannot usefully continue. Similarly, the running program might call operating system, library, or other routines that are, for various reasons beyond the programmer's control, unavailable at that moment. A common error, for instance, occurs when a program seeks access to a file that is not available. As with hardware resource exceptions, the program must either take evasive action or simply terminate (exit or abort). Exceptions of this type are especially common in modern computing environments where a set of independent user applications, or a set of independently executing threads within the same program, must share the same resources.

Apart from resource availability and unpredicted user actions, a further source of runtime errors involves genuine coding bugs not detectable during compilation or linkage. For example, an arithmetical expression, accepted as legal by the compiler, may produce a runtime error for certain values of its variable components. Typical cases are the "divide-by-zero" error and similar situations where the expression cannot be correctly evaluated. Such errors are predictable and avoidable in theory. In practice, however, traditional exception-handling solutions have involved a hard-coded plethora of conditional tests of variable values before each expression is evaluated, followed by ad hoc routines to bypass invalid evaluations. For example:

---

```
if (X != 0)
    Y/X;    // OK to divide by X
```

```
else
{
    // problem: how/where to handle the divide-
    // by-zero exception?
};
```

The approach is at best tedious and prone to error.

Most of the high-level languages currently used for program development exploit the concept of modularity whereby a commonly required set of operations can be encapsulated in a separately named subroutine, procedure, or function. Once coded, such subroutines can be reused by "calling" them from any point in the main program. Further, a subroutine may call a subsubroutine, and so on, so that in most cases an executing program is seldom a linear sequence of instructions. In the C language, for example, a main() program is written which calls a sequence of functions, each of which can call functions, and so on. If all goes well, control eventually returns to main(). This nesting of function calls simplifies the construction of programs but, at the same time, complicates the handling of exceptions. The essence of a function call is that it must pass any arguments (or parameters) to the target function, transfer control to the memory section holding the function's executable code, return the result of the call, and at the same time, store sufficient information to ensure that subsequent execution resumes immediately after the point where the original function call was made. This function-calling mechanism, as is well-known in the art, is usually achieved by pushing and pulling data and memory addresses on and off a stack prior to, during, and after, the call. A stack is simply a dedicated portion of memory organized as a LIFO (last in, first out) data structure. The stack is not normally manipulated directly by the programmer, but its contents are changed as a result of the function calls coded by the programmer. Programs do have direct access to another portion of memory, called the heap, and a key element in exception handling involves the management of this vital resource.

After a successful function call, the stack is unwound, that is to say, all data which were "pushed" onto the stack are "popped" off in reverse order, leaving the stack in its pre-call state ready for further function calls; execution resumes in the function which made the call. Note that, since function calls can be nested to arbitrary levels, the stack must maintain a vital, complex sequence of return values and instruction pointers essential to the proper execution of the program. Eventually, absent any problems, control ends back in main(), and after the final successful function call in main(), the program terminates. Any interruption to this unwinding process leads to an unbalanced stack with unpredictable results. For instance, a called function expects to find its arguments in a particular section, known as the function's stack frame, at the top of the stack; if the stack is unbalanced, the function will pull off erroneous data, further compounding the runtime error.

Clearly, exceptions occurring in a nested function can create a particularly difficult problem. Expectedly, several exception-handling approaches have been attempted to address the problem. One approach, for instance, is to have each function return an error indication, either in a separate variable, or as a special range of values for the normal return value. The immediate onus of exception handling then rests on the calling function. If the calling function is unable to cope, it must return an error indication to its calling function, and so on up the chain until either a function is reached that can handle the exception, or until main() is reached. If main() cannot correct the problem, it terminates as gracefully as possible, perhaps displaying an explanatory message for the user.

As an illustration, suppose that main() calls funcA() which, in turn, calls funcB(). funcB() is programmed to return, say, zero for success or a positive number indicating the reason for failure. For example, funcB() might return 1 for "insufficient memory," 2 for "file not found," and so on. funcA() always tests the value returned by funcB(). If this test indicates success, funcA() carries on and eventually returns control to main(). If funcA () detects that funcB() suffered an "insufficient memory" error, it may well be able to correct the situation (by "collecting garbage" or by defragmenting the heap) and then call funcB() again. But if funcA() detects the "file not found" error, it may have no means of handling this situation other than displaying a warning. Unable to continue, funcA() must then return an error value to main(). What, if anything, main() can do with this error will, of course, depend on the particular application.

The merit of this "error chaining" scheme is that the stack is always unwound correctly, but there are several serious disadvantages. Each function in the chain is saddled with code that "looks" for exceptions occuring in its called functions. This code must also "decide" which exceptions can be handled and which ones have to be returned to the calling function. When the function calls are deeply nested, and the number of different exception types increases, the testing and chaining of exceptions becomes a major, error-prone programming headache. A significant obstacle to well-formulated, easy-to-read, maintainable code is apparent from the simple example outlined above. If main() is left to handle an exception returned by funcA(), it may need to know both the type of exception and where the exception occurred. The type of exception is clear from the error code, but the fact that it occurred in funcB() and not in funcA() or, as the program is changed and extended, some other function in the chain, is not immediately apparent without additional error encoding.

One response to this problem is the global (or long) goto label instruction that can transfer control from any point of any function to a routine residing anywhere in memory, at the address given by the identifier, label. Under this regime, the funcB() of the preceding example need not return error codes up the function chain, but, on detecting an error can send control directly to an appropriate exception handler:

```
retVal funcB ( )     // suggestive code only; not legal C
{
    serr = 'B';      // optional: identify this function
    ...              // request memory here
    if (no_mem) goto no_mem_handler;
    ...              // try to access file here
    if (no_file) goto no_file_handler;
    ...              // funcB does its thing
    return result; // return to calling function
}
main ( )
{
    ...
    no_mem_handler:
        { // check value of serr and handle exception
        }
    no_file_handler:
        { // check value of serr and handle exception
        }
    ...
}
```

The routine at no_mem_handler is presumed to handle all "insufficient memory" errors and, if necessary, use the value of serr to determine in which function the error occurred. In the current terminology, funcB() "throws" the "insufficient memory" exception, while the routine at no_mem_handler "catches" the exception.

This simple global goto approach has the merit of offering a single, readable place for each exception handler, but in practice it creates more problems than it solves. First, the standard goto instruction in the C and C++ languages operates only within a function; it lacks the required, long-distance power to transfer control between functions. Second, as it stands, the direct transfer to a handler fails to correctly unwind the stack, as described earlier. Finally, and related to the first two objections, additional mechanisms to allow control to return, if necessary, to the throwing function are needed. In order to resume execution in the throwing function on those occasions when the handler is able to "correct" the error, the exception-handling mechanism must allow the preservation and restoration of the state or context of the throwing function.

When funcB() throws an exception, for example, its local variables will hold particular values. As the name implies, the scope and existence of local variables is limited to the "life-span" of the function: they disappear when the function yields control. These local values and other parameters such as the current values in the registers of the central processor constitute the state of funcB(). In particular, the state includes the stack status and the current IP (instruction pointer) that marks the place in memory where execution must be resumed. This state must be completely saved before the handler is called, and then completely restored before execution of funcB() can be safely resumed.

Some of the deficiencies of the global goto "solution" have been alleviated by the introduction of two Standard C library functions, setjmp() and longjmp(). setjmp() can be called in any function at the point at which control should be resumed if a matching longjmp() is called in another function. Typically, longjmp() is called when an exception is thrown. setjmp() takes as an argument the address of (pointer to) a programmer-supplied memory buffer in which the state of the current function will be saved. As discussed earlier, this state holds the processor registers, including the current IP (instruction pointer), needed to resume execution immediately after the setjmp() call. longjmp(), unlike goto, can transfer control across different functions as follows: longjmp() takes as one of its arguments the same buffer address which is used in the matching setjmp(). When longjmp() is called, it recovers the state saved by setjmp(), and transfers control to the address found in the stored IP, namely the instruction following the setjmp() call. Further, longjmp() takes a second numeric argument which can be tested in the function that called setjmp(), thereby providing a mechanism for determining which particular longjmp() caused the jump. The following program snippet illustrates the use of these functions:

```
#include <setjmp.h>
// makes the setjmp ( ) and longjmp ( ) library functions
// available
jmp_buf aJmpBuf;    // create a state (jump) buffer
void fna ( )
{
    int retval;
    retval = setjmp(aJmpBuf);
    // store current state in state buffer
    if (retval)    {
            printf("Got here via longjmp( )\n"};
            exit(-1);
```

-continued

```
    }
    fnb ( );
    fnc ( );
}
```

In fnb(), fnc(), or in any function they call, or in any function these functions call (and so on), the statement longjmp(aJmpBuf, status);

ensures that the setjmp() in fna() will be "recalled" under special circumstances in order to return value status in retval, following which, control will revert to the if (retval) line in fna(). In the absence of any longjmp() calls in subsequent functions, setjmp() returns zero (false), so that the if (retval) test fails. Thus, the setjmp() and longjmp() pair offer a global goto method for exception handling. Exception handlers can be encapsulated into any convenient set of functions, and after suitable handling, control can, if required, be safely transferred back to the functions in which the exception occurred.

However, the setjmp()/longjmp() solution has pronounced disadvantages. First, there is no guarantee that the function to which longjmp() returns is still active. In the previous example, it is possible that fna() has already returned, relinquishing its place on the stack, before a matching longjmp() is encountered. The only solution to this problem is to restrict setjmp() calls to the main() program. Second, the stack unwinding problem in the presence of nested setjmp ()s and longjmp ()s requires careful explicit programming. Third, setjmp() and longjmp() are not compatible with the Microsoft Windows API (Applications Programming Interface). Finally, many popular program overlaying and virtual memory techniques employ special stacks, so that a function's status is not completely stored by setjmp(). All told, present-day approaches have failed to adequately address the problem of handling exceptions.

SUMMARY OF THE INVENTION

A system of the present invention includes a development environment having a compiler, a linker, and an interface. Through the interface, a developer (user) supplies source listings to the compiler. The source listings include exception handling constructs, in accordance with C/C++ exception handling syntax. From the source listings, the compiler generates compiled object modules, which may be linked with other object modules or libraries to generate programs executable by a target processor.

The compiler implements methods for handling of exceptions, which may occur during runtime execution of the program. In an exemplary embodiment, the system of the present invention registers exception handling information (e.g., Exception Registration Record) with the underlying operating system, during execution of prolog code for each function (or other discreet section of code). The method is implemented so that the Exception Registration Record (ERR) resides at the bottom of the stack (or top of stack, for stack-based systems whose system stack grows upward) so that the information is positioned at one end of the stack during execution of the function (or other identifiable section of code). This requires, for instance, that automatic (stack-based) variables be placed on the stack before the Exception Registration Record. In this manner, the method allows the system of the present invention to readily and efficiently register an exception handler with the operating system, by merely executing a series of "push" instructions for pushing data members of the ERR onto the stack (including "pushing" the value of zero for data members which are to be cleared). In a corresponding manner, upon completion of execution of the function, the record may be "unhooked" from the handler chain on the stack by simply executing a series of "pop" instructions.

Other methods are described for improving exception handling, including a preferred layout for a context table and further including use of a destructor count.

BRIEF DESCRIPTION OF THE DRAWINGS

FIG. 3 is a diagram illustrating a preferred method of the present invention for registering or "hooking" a registration record to an operating system (OS) exception chain.

FIG. 4 is a diagram illustrating a context table of the present invention, which stores one or more context entries.

FIG. 5 is a diagram illustrating context table entries which are employed for try/except exception handling constructs.

FIG. 9 is a diagram illustrating occurrence of a try/finally block within a setjmp block.

FIG. 11 is a diagram illustrating a context table entry employed for try/catch constructs.

FIG. 12 is a diagram illustrating a catch handler table (and its entries) which is employed with try/catch constructs.

FIG. 13 is a diagram illustrating translation of source listings having a try/catch construct into corresponding compiled code.

FIGS. 14A–B are diagrams illustrating use of a destructor count of the present invention.

FIG. 15 is a diagram illustrating a context table employed for destruction cleanup, and further illustrates a destructor cleanup object table of the present invention.

FIG. 16 is a block diagram illustrating use of the destructor count, for auto (automatic) variable cleanup.

DETAILED DESCRIPTION OF A PREFERRED EMBODIMENT

General Architecture

A. System Hardware

Figure 1A:
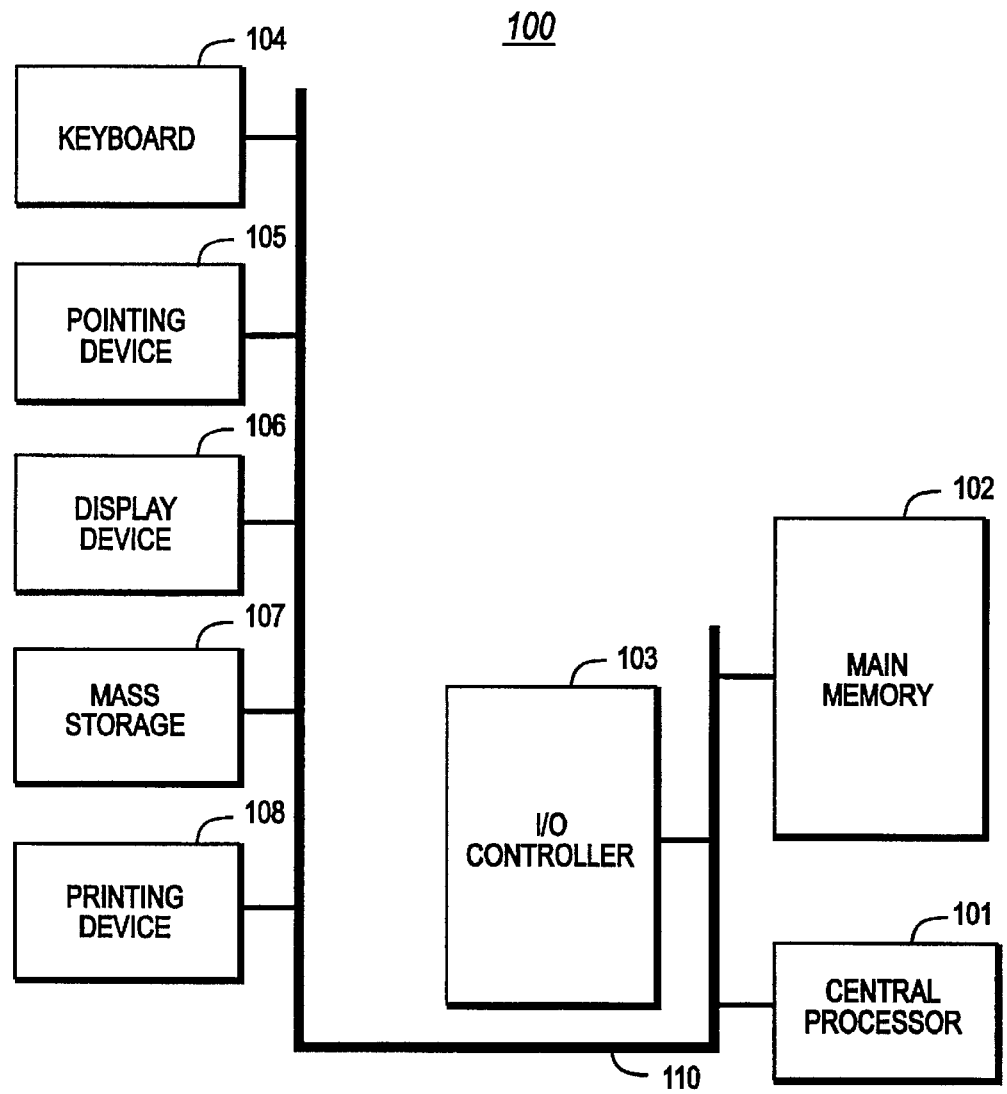
FIG. 1A is a block diagram of a computer system in which the present invention may be embodied.

The present invention may be embodied on a computer system such as the system 100 of FIG. 1, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be provided with the system 100 as desired. As shown, the various components of the system 100 communicate through a system bus 110 or similar architecture.

B. System Software

The following description will focus on the presently preferred embodiments of the present invention, which are operative in an event-driven system, particularly Microsoft Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

Figure 1B:
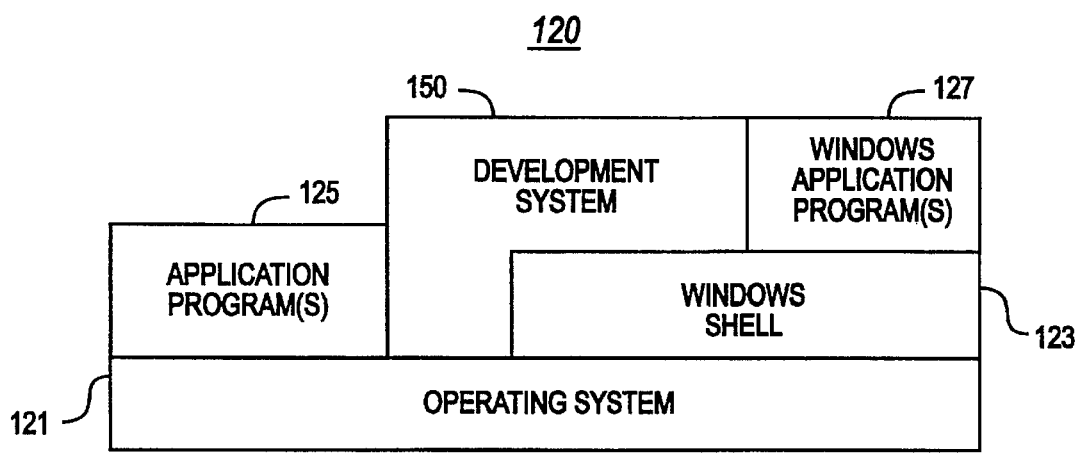
FIG. 1B is a block diagram of a software system for controlling the operation of the system of FIG. 1A, the software system including a development system of the present invention.

Illustrated in FIG. 1B, a computer software system 120 is provided for programming the operation of the computer system 100. Software system 120, which is stored in system memory 102 and on disk memory 107, includes a kernel or operating system (OS) 121 and a windows shell or interface 123. One or more application programs, such as application programs 125 or windows applications programs 127, may be "loaded" (i.e., transferred from storage 107 into memory 102) for execution by the system 100. OS 121 and shell 123, as well as application software 125, 127 include an interface for receiving user commands and data and displaying results and other useful information. Software system 120 also includes a development system 150 of the present invention for developing system and application programs. As shown, the development system 150 includes components which interface with the system 100 through windows shell 123, as well as components which interface directly through OS 121.

In a preferred embodiment, the system 100 includes an IBM-compatible personal computer, available from a variety of vendors (including IBM of Armonk, N.Y.). Operating system 121 is MS-DOS and shell 123 is Microsoft® Windows, both of which are available from Microsoft Corporation of Redmond, Wash. Alternatively, the system 100 may be implemented in other platforms, including Macintosh, UNIX, and the like. Development system 150 includes Borland® C++, available from Borland International of Scotts Valley, Calif. Application software 125, 127, on the other hand, can be any one of a variety of application software, including word processing, database, spreadsheet, text editors, and the like.

C. Development System

Figure 1C:
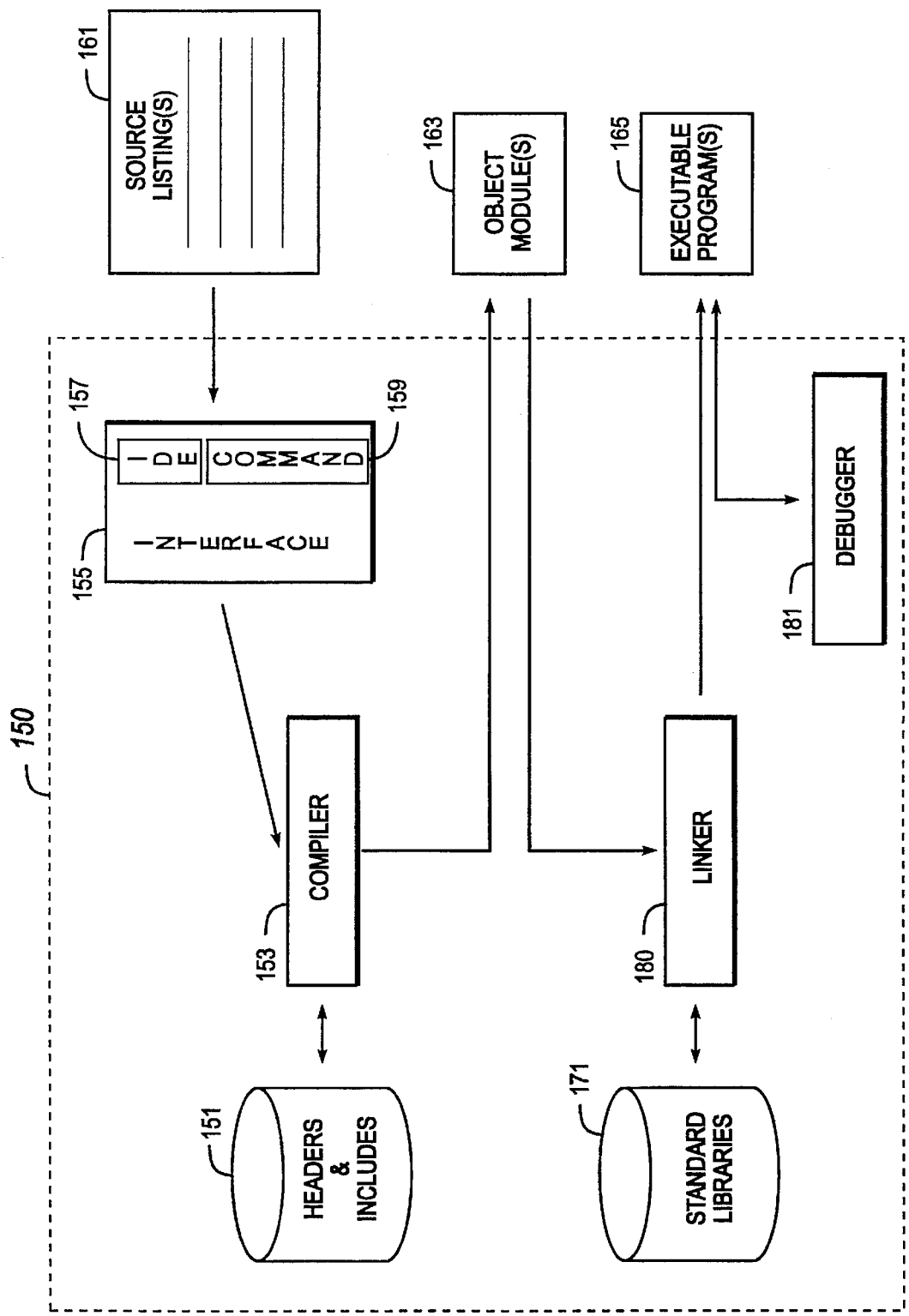
FIG. 1C is a block diagram of the development system of FIG. 1B.

Shown in further detail in FIG. 1C, the development system 150 of the present invention includes a compiler 153, a linker 180, and an interface 155. Through the interface, the developer user supplies source modules 161 to the compiler 153. Interface 155 includes both command-line driven 159 and Integrated Development Environment (IDE) 157 interfaces, the former accepting user commands through command-line parameters, the latter providing menuing equivalents thereof. From the source code or listings 161 and headers/includes files 151, the compiler 153 "compiles" or generates object module(s) 163. In turn, linker 180 "links" or combines the object modules 163 with libraries 171 to generate program(s) 165, which may be executed by a target processor (e.g., processor 101 of FIG. 1A). The standard libraries 171 include previously-compiled standard routines, such as graphics, I/O routines, startup code, and the like. An exception handling module 181, described in greater detail below, is provided for handling runtime errors in the programs 165. A description of the general operation of development system 150 is provided with Borland®C++, available directly from Borland International.

Exception Handling

A. Introduction: ANSI C++ Syntax

The most promising exception-handling syntax is that adopted for ANSI C++, which can be can generally viewed as an object-oriented extension or superset of ANSI C. With its adoption by the ANSI C++ standards committee, the syntax is now an integral part of the ANSI C++ language, and the programmer can demand that any code written to the new standard will be interpreted in a consistent manner by any conforming compiler. In contrast to the earlier C and C++ exception-handling mechanisms discussed above (e.g., setjmp and longjump), the C++ exception syntax is more portable and reliable, and does not depend on ad hoc library routines that lack official ANSI standardization.

The exception-handling syntax adopted by the ANSI C++ committee introduces three new keywords, try, throw, and catch, to the previous ANSI C++ language specifications. These enhancements, once implemented, provide the programmer with a simple, self-documenting method of trapping (throwing) and handling (catching) runtime errors while hiding most of the underlying complexity.

In order to establish an exception handler for a section of C++ code, a try block is used. A try block is followed by one or more catch clauses, which handle different types of exceptions. Exceptions are thrown by evaluating a throw expression; with some minimal restrictions, a value of any C++ type can be thrown (that includes throwing a class object by value). This new ANSI C++ syntax is perhaps best explained by way of example. Consider the following code snippet:

```
int f ( )
{
    try {      // start of try block
        // ...
        return g( );
    }
    catch (xxii) {   // start of exception handler
        // reach here only if error type 'xxii' occurs
        error ("Error 'xxii' during g( )");
        return 22;
    }
    catch (. . . ) {   // catch-all exception handler
        // reach here if some other error occurs
        error ("Some other error during g( )");
        return -1;
    }
}
int g( )
{
    // ...
```

```
    if (something_wrong)
        throw xxii( );  //exception thrown
    // ...
    return 0;
}
```

In the example, the keyword try introduces a block of code called a "try block." All code that is to be subjected to exception handling must be placed inside a try block, surrounded by the standard C/C++ curly-bracket block delimiters, "{"and"}" as shown. In other words, exception handling is an optional feature: the keyword try gives the programmer the freedom to decide which portions of his or her code, if any, may require exception handling.

In the sample above, the try block in f() calls the function g() and, if all goes well, f() simply returns the value returned by g(). However, if something goes wrong during the execution of g(), a "throw expression" (or "throw point") is invoked:

```
if (something_wrong)
    throw xxii( );  //exception thrown
```

The throw expression not only passes (throws) control to an appropriate (matching) exception handler but also specifies the origin or type of the exception. The syntax allows the programmer to specify both the handler that should "catch" the exception and the "identifying" data to be transferred to the handler. A throw expression consists of the keyword throw followed by an optional "assignment expression." The latter serves to direct the flow of execution to the appropriate (matching) exception handler. The assignment expression also allows the transmission of arbitrary amounts of data, including but not limited to exception-type information, from the throw point to the handler.

The exception handlers themselves are coded in "catch blocks" each prefixed by the keyword catch followed by a parenthesized "exception declaration." Exception declarations are essentially lists of data-type specifiers. Appropriate handler code must follow each try block in the form of a sequence of catch blocks, with a specific catch block for each anticipated exception thrown in that try block. The basic rule is that the assignment expression used in the throw expression will "seek" the nearest match with the data-type specifiers of a catch block. The order in which the catch blocks are coded plays a major role, since a match is sought sequentially by scanning each catch declaration from top to bottom. Once such a match is found, the assignment expression is copied to the catching data-type and the code in the matching catch block is executed. Thus, in the given example, the assignment expression in throw xxii() matches the data-type specifier in catch (xxii), and the address of the function xxii() is available to the catch block.

When an exception is thrown and caught, any function calls between the throw and catch point are unwound. That is, any local variables that have been constructed in those functions must be properly finalized (i.e. their destructors must be called)—a process referred to as destructor cleanup.

In many ways throw acts like a conventional function call with its assignment expression serving as an argument to be passed to the matching handler. For example, consider a try block calling either throw "Yo" or throw "Ho" depending on the exception encountered. Both exceptions would match, and transfer execution to, the catch block

```
catch (const char *str) {
    // handle the exception here
    printf("Caught '%s'.\n", str);
    // displays "Caught 'Yo'." or "Caught 'Ho'."
}
``` since "Yo" and "Ho" are both of data-type "constant string" (const char *). However, since the value "Yo" or "Ho" is passed (copied) to the variable str, the catch body can distinguish between the two exceptions.

In real-world programs, the throw expression typically passes a C++ object (or a pointer or reference to a C++ object) representing both the exception class and the data needed by the handler. Indeed, the great flexibility of the ANSI C++ exception-handling mechanism arises from the fact that error types can be grouped and encapsulated in classes. These let the programmer exploit the object-oriented power of C++ via inheritance and polymorphism. ANSI C++ itself specifies a variety of standard exception classes for common runtime errors from which the programmer can usefully derive custom classes and methods. For example, ANSI C++ mandates a general xmsg exception class that simplifies the display of error messages by providing an xmsg::why() method. Other standard exception classes, such as xalloc for handling memory-allocation failures, are derived from xmsg and thereby inherit its basic error-reporting methods.

The general topic of C++ and C++ exception handling syntax is well covered by the technical, trade, and patent literature. For an introduction, the reader may consult Ellis, M. and Stroustrup, B., The Annotated C++ Reference Manual, Addison-Wesley, Reading, MASS, 1990. Further discussion may be found in Reed, D., Exceptions: Pragmatic issues with a new language feature, C++ Report, pp. 39–44, October 1993, and Lajoie, J., Exception Handling: Supporting the runtime mechanism, C++ Report, pp. 36–43, March–April 1994. Additional treatment of the topic may be found in Cameron, D. et al., A portable Implementation of C++ Exception Handling, C++ Technical Conference, USENIX Association, pp. 225–243. The disclosures of the foregoing are hereby incorporated by reference.

B. Problems with implementing ANSi C++ Syntax

The proper implementation of the ANSI C++ exception-handling specification has proved to be a major challenge to compiler and runtime library designers, especially as the number of operating systems and architectures continues to escalate. Although C and C++ are justly renowned as portable and efficient languages, the diversity of operating systems now in use, such as MS-DOS, Win16, Win32, NT, and OS/2, offers widely different systems services for supporting exception handling, exacerbating the problem of providing a uniform implementation.

The use of objects in particular adds considerable complexity to many aspects of exception-handling implementation. For instance, when matching the throw expression with a handler type, the system needs to distinguish between compile-time (static) and runtime (dynamic) data-typing. The recent addition of the RTTI (runtime type information) feature to ANSI C++ was motivated by this need to determine the real runtime data-type of pointers to polymorphic objects.

The formal throw-expression/handler-type matching rules are as follows: A handler with type T, const T, T&, or const T&, where T is any standard or user-defined type, will match a throw expression of type E if and only if either (1) T and E are the same type, or (2) T is an accessible base class of E at the throw point, or (3) T is a pointer type and E is a pointer type that can be converted to T by a standard pointer conversion at the throw point. An important implication of these rules is that the catch block for a derived exception class must be listed ahead of the catch block for its base exception class, otherwise it will never be accessed.

The new ANSI C++ syntax also allows the programmer to specify which exceptions, if any, a function can directly or indirectly throw. The optional exception specification throw (type_list$_{opt}$)

can be used as a qualifying suffix to the normal function declarator, as shown in the following example:

```
void f( ) throw(X, Y)
{
    // ...
}
```

This definition limits to X and Y the types of exceptions that f(), or any function called by f() (and so on, to any depth) can legally throw. Throws can be completely inhibited by omitting the type_list argument. Thus, the definition

```
void f( ) throw( )
{
    // ...
}
``` means that f() cannot legally throw an exception, and neither can any function called by f() (and so on, to any depth). In the absence of an exception specification, which is the normal C/C++ syntax for declaring or defining a function, a function is free to throw any exception type. If a prohibited throw is attempted by f(), directly or indirectly, the special function unexpected() is called. The default action of unexpected() is program termination, but this can be programmer-customized via the set_unexpected() function.

The ANSI C++ syntax also allows for a "catch-all" exception handler that can be invoked if the throw expression fails to find a match among the earlier catch blocks. Referring back to the earlier catch (xxii) example, the catch block

```
catch (...) {   // catch-all exception handler
    // reach here if some other error occurs
    error("Some other error during g( )");
    return -1;
}
``` uses the special exception declaration (...) guaranteed to match all throw expressions. If used, the catch (...) handler must clearly be the last handler for its try block. If the catch-all handler is missing, it is possible that a thrown exception will fail to find a matching handler. Such exceptions invoke the special function terminate(). By default, terminate() aborts the program but the programmer can customize this action by using the set_terminate() function.

Since exceptions can occur during exception handling, ANSI C++ allows nested try and catch blocks. In other words, it is legal to throw exceptions within a catch block. The nesting of exceptions serves several purposes. For example, some exceptions may be best handled close to where the error occured, while others are better handled by general purpose handlers located higher up in the nested function tree. Having handled certain exceptions "locally,"

the remainder, caught perhaps with the catch (. . .) feature, can be "re-thrown" to some other, "outer" handler. Alternatively, an exception might be partially handled within a catch block before being thrown to another handler for further processing, and so on to any depth.

Re-throwing is achieved by using a throw expression without an operand. Since execution has reached a catch block, there must be a current exception of known type, so there is often no need to repeat this information in the throw expression. Re-throwing, of course, is only possible within a catch block. For example,

```
try {
    // try block
}
catch (local) {
    // . . . handle the local exceptions
}
catch (. . .) {     // catch all other exceptions
    // . . . partially resolve the exception
    throw;      // rethrow the exception to another
                // handler
}
```

As noted earlier in the case of exception-class matching, the possibility of nested try and catch blocks in ANSI C++ adds considerable programming power to the language but, at the same time, increases the complexity of compiler and runtime implementation. To find the proper handler for an exception, the stack-unwinding routine must now "know" the state of every active function it encounters as it unwinds the stack. For each nested function call that is unwound, the following questions must be answered at runtime: (1) Does the current function have an active try block? (2) If so, can any of the corresponding exception handlers handle the thrown exception? As explained earlier, this means seeking a match between the thrown exception type and a sequence of catch expressions attached to the currently active try block.

Other aspects of object-orientation further compound the exception-handling problem. In addition to the stack unwinding problem previously discussed, an object-oriented language such as C++ requires that local (stack) objects be properly constructed (that is, created and initialized) and eventually destroyed. When a C++ function is called, the system not only allocates stack space for local (auto) variables, but constructors are called automatically to copy function arguments and create local objects. For objects with complex class hierarchies, a simple declaration such as TWindow myWindow; might generate a host of constructor calls to many parent classes down the inheritance chain. On normal function exit (return), supplementing the usual stack unwinding, destructors are automatically called by C++ (in reverse order to the corresponding constructor calls) to destroy these local objects and restore the stack.

Equally complex constructor and destructor activity occurs within the blocks of a function execution as objects "move" in and out of scope, including the fate of many temporary objects implicitly generated and discarded beyond the direct control of the programmer. This harmonious, "zero-sum" balance between object construction and destruction, however, is clearly threatened by any abnormal function termination that happens to bypass a destructor call. In particular, when an exception is thrown, the system must ensure that all relevant objects, whether wholly or partially constructed, are correctly destroyed and removed from the stack before control is sent to the appropriate catch block. For example, consider the following code snippet:

```
struct foo {
    foo( ) {printf("foo constructor called\n");}
    ~foo( ) {printf("foo destructor called\n");}
};
void toss ( ) {
    foo local_var;
    // . . .
    if (yo_error) throw "yo";
    // . . .
    return 0;
}
void doit ( ) {
    try {
        toss( );
    }
    catch (const char *str) {
        printf("Caught '%s'.\n", str);
    }
    catch (. . . ) {
        printf("Caught something else.\n");
    }
}
int main ( ) {
    doit ( );
    return 0;
}
```

In this example, if toss() terminates normally, the foo destructor, ~foo(), is automatically called to destroy the local foo object, local_var. But if an exception is thrown in the toss() try block, this normal "out-of-scope" destructor call will not be invoked. Hence, before control is transferred to the active catch block in doit(), and before the stack frame for toss() is removed, the exception-handling system must call the foo destructor to completely destroy local_var and any of its associated objects.

Rather than placing this burden on the programmer, as is the case with other systems, the ANSI C++ exception-handling specification dictates that the appropriate destructors be automatically called for all local objects "left" on the stack, whether wholly or partly constructed, prior to exceptional stack unwinding. In addition, therefore, to registering events such as the entering and leaving of try block, as noted earlier, the runtime exception system must keep track and maintain proper balance between the occurrences of constructor and destructor calls during each function's execution. In the present invention, as detailed below, a global "destructor count" is maintained within each function's frame. Constructors increment and destructors decrement this count, so that if a function is exited exceptionally, the count can be used to determine which objects need to be destroyed.

In addition to "automatically" creating and destroying local objects on the stack, ANSI C++ sanctions the creation and destruction of dynamic objects on the heap using the explicit operators new() and delete(). Briefly, the new() operator, which can be overridden for specific classes, allocates heap memory, calls a constructor for the given class, creates and initializes an object (class instance) on the heap, and returns a pointer to the new object. A returned null (zero) pointer indicates that new() has failed, either through insufficient memory or because of some error during construction or initialization. If a non-null pointer is returned by new(), indicating success, it must be used as an argument when calling the delete() operator. This invokes the appropriate destructor and frees the heap memory. Thus, in the following code sample,

```
foo* fooPtr = new foo;      // create a foo object
                            // or throw an exception
// . . . *fooPtr is OK so use it
delete fooPtr;              // kill it
``` a dynamic foo object is created (pointed to by fooPtr) without the explicit need to test for success. Note again that new() can fail in two ways. First, foo can fail by insufficient memory being available for an object. This exception is handled automatically by the standard ANSI C++ xalloc exception class, with possible user-customization. Second, the foo contructor, or any base constructors invoked for foo, can fail. The ANSI C++ standard insists that any fully or partially constructed objects resulting from such failures are destroyed. Exceptions of this type are handled by the runtime implementation, and appropriate methods discussed below, of the present invention.

The life-span of dynamic objects is not controlled by syntactic scope, so the onus is on the programmer to maintain a "tidy" heap by explicitly removing (deleting) dynamic objects when they are no longer needed. It therefore follows that if an exception is thrown after successful construction but before the appropriate delete() is called, one or more objects can remain as "garbage" on the heap. For example, in the following snippet,

```
foo* fooPtr = new foo;      // create a foo object
                            // or throw an exception
// . . . *fooPtr is OK so use it
if (error) throw("help");
delete fooPtr;              // kill it
``` an exception that throws "help" will, absent proper action by the action by the programmer, leave the foo object on the heap. Automatic exception handling systems do not trap such events.

A lack of balance here is less dangerous than a stack-unwinding imbalance, but the resulting "memory leakage," if left unchecked, may eventually compromise the application. The preferred exception-handling implementation, therefore, must carefully track all dynamic objects created with operator new() and ensure their deletion in those cases where the constructor (or any base constructors) invoked by new() fails. To achieve this aim, the runtime system needs to establish yet another context, one that relates "globally" to specific new/delete calls as execution proceeds. As with stack objects, the present invention maintains a global destructor count for new() and delete() calls. Establishing this context and count is complicated by the existence of virtual (polymorphic) destructors. With a new() operator, the object type is known at compile time, but for classes with virtual destructors, the call delete p; where p is a pointer, cannot be resolved until runtime. Again, as with the exception-type matching problem discussed earlier, the RTTI (Run-time Type Information) feature must be invoked to ensure that the destructor count for the "real" object (*p) is decremented.

Summing up, the ANSI C++ exception-handling specification promotes fault-tolerant programming by way of a reliable "termination" model that eliminates the dangers of endless loops possible in the "resumptive" model. Control can be safely transferred to and from independently written programs and translation units using intuitive throw and catch statements. Exception handling is optional, restricted to functions enclosed in a try block. Exceptions are distinguished by class (both predefined and user-defined data types). Exception classes can be refined (specialized) by the usual C++ inheritance and multiple inheritance mechanisms. Several base exception classes are specified by ANSI C++ from which the programmer can derive custom exception classes. Exceptions can be "nested," allowing exceptions to be thrown during exception handling.

Stack integrity is assured regardless of where the exception is thrown. All local objects, however constructed, wholly or partly, are guaranteed to be correctly destroyed and removed from the stack during exceptional unwinding without the need for explicit programmer action. Dynamic objects created on the heap are also deleted if the exception bypasses normal deletion.

Structured Exceptions and C++ Exceptions

The present invention provides a uniquely efficient, portable, and flexible implementation of the ANSI C++ exception-handling specification as will now be described. As the present invention exploits available OS exception services, such as those available from the above-mentioned operating system, it is helpful to first review generally these standard resources available from operating systems (such as MS-Windows and IBM OS/2).

A. OS Exception Services

An OS, such as OS/2, maintains a singularly linked list of active exception handlers. Usually each stack frame that wants to catch exceptions will establish a handler, hook it into the OS chain upon entry, and remove it upon exit (all exit paths are required to do this, including return and longjmp). The following will focus on the services of OS/2. Whether Microsoft Win32 or IBM OS/2 is employed, the underlying OS mechanism is essentially identical, however.

Figure 2:
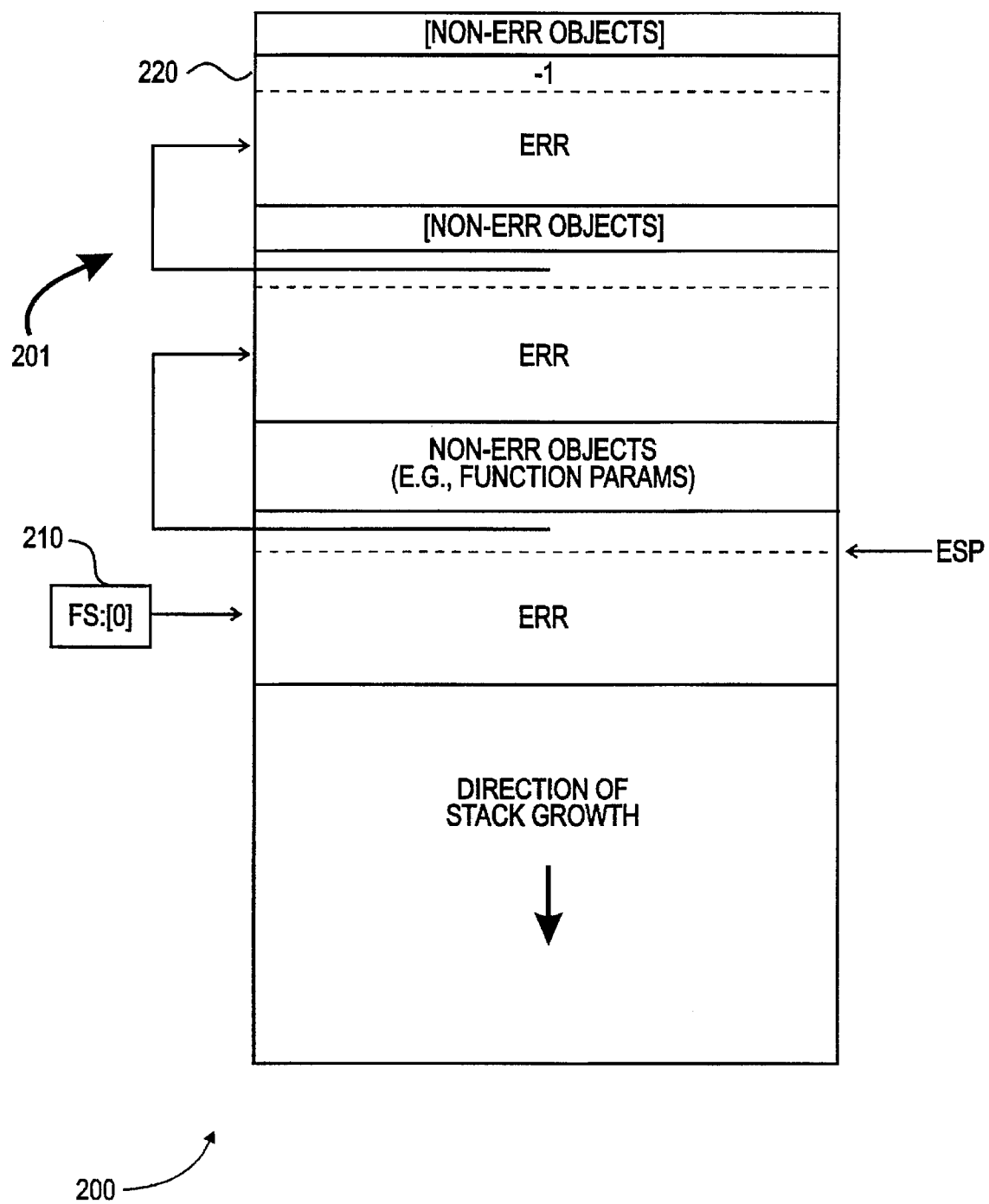
FIG. 2 is a block diagram illustrating storage of exception registration records (ERR) on the system stack (memory).

Operating systems, such as Windows NT and IBM OS/2, employ a mechanism which makes use of the system stack memory, as shown by stack 200 in FIG. 2. The mechanism is fairly simple and consists of a thread-based, stack-based linked list of handlers. The linked list of exception handler records 201 is exemplary. Although various OS vendors may apply an arbitrary syntax for exception handling, the underlying mechanism remains essentially that as shown in FIG. 2. The construction and operation will now be described in further detail, with particular emphasis on Windows NT.

In Windows NT, since the FS register of the CPU points to the thread environment block and since exception handling is stack-based, the location at offset zero in the FS segment (FS:[0]) is used to point to the current, top-most exception registration record (ERR), as shown at 210. Each registration record includes a pointer which points to a previous record of the chain. The pointer of the final record stores −1, to signify the end of the chain, shown at 220.

The exception registration stack is employed as follows. When a program wants to register an exception handler (i.e., the program is entering a stack frame where the program wants to handle some exceptions) the program hooks into this chain. The program loads FS:[0], storing the value in the previous pointer, and assigns the address of the new registration record into FS:[0]. In this manner, the program has established an exception handler with the operating system.

In operation, if an exception occurs in the executing function of the program while the exception record is still hooked into the chain, the operating system will make a call into an address stored below the previous pointer in the exception record, passing information about the exception. The operating system expects the program to return values indicating how the exception is to be dealt with. If the program responds with a value indicating that it is not interested in handling this particular exception, the operating system continues to traverse the list of handlers (i.e., ERR records), looking for a handler which is interested in processing the exception. If no such handler is located, the operating system eventually reaches the end of the chain (i.e., record having pointer to previous record set to −1) and terminates the program without handling the exception. On the other hand, when the operating system locates an exception handler which wants to handle the exception or when the end of the chain is found, the operating system will perform an unwind of the stack. Thus, if a frame is found which wants to handle the exception, all frames created subsequent (to the one which will handle the exception) will also be unwound.

If an exception handler does handle the exception it may instruct the operating system to restart the instruction which triggered the exception. In such an instance, the handler changes the context record which describes the state of the machine and returns out of the handler function that the operating system called (via the function pointer stored in the exception registration record)—returning a value indicating that the instruction is to be restarted. At this point, the exception is considered "handled" and execution of the program is resumed.

However, an exception handler may decide that it wants to handle an exception but does not want to resume execution of the program. In such an instance, the handler does not return to the operating system, indicating that it wants to handle the exception. Instead, the handler will call back into the operating system for unwinding all stack frames that are above it and then it jumps to its desired handler routine. In this manner, the handler does not return to the operating system for indicating that it will handle the exception.

are syntax which provides a means by which a program, through the C programming language, can access exceptions.

The API services provided by the OS will be examined in further detail. IBM OS/2 is exemplary, as it includes several exception support API calls. The call DosSetExceptionHandler inserts a specified Exception Registration Record at the head of the OS exception handler chain; it is defined to have the following API interface (function prototype):

```
APIRET DosSetExceptionHandler (PEXCEPTIONREGISTRA-
    TIONRECORD pERegRec);
```

Correspondingly, DosUnsetExceptionHandler is provided for removing the specified exception registration record from the OS exception handler chain:

```
APIRET DosUnsetExceptionHandler (PEXCEPTIONREGISTRA-
    TIONRECORD pERegRec);
```

For performance reasons, compiler-generated code accesses the OS exception chain directly rather than going through these API's.

The function DosRaiseException throws an exception, specifying an exception code, flags, and an optional set of additional user-defined parameters:

```
APIRET DosRaiseException (PEXCEPTIONREPORTRECORD
    pexcept);
```

The function DosUnwindException is provided for performing an unwind up to the given exception frame, followed by a jump to a specified address:

```
APIRET DosUnwindException (PEXCEPTIONREGISTRATIONRECORD pERegRec,
    PVOID pTargetIP, PEXCEPTIONREPORTRECORD pERepRec);
```

The foregoing function calls employ an EXCEPTIONREPORTRECORD data structure, which is defined (e.g., in OS/2) to have the following layout:

```
// Exception Report Record
typedef struct _EXCEPTIONREPORTRECORD;
{
    unsigned long exceptionCode;
    unsigned long exceptionFlags;
    PEXCEPTIONREPORTRECORD NestedExceptionReportRecord;
    void *exceptionAddress;
    unsigned long exceptionParamCount;
    unsigned long exceptionInfor[EXCEPTION_MAXIMUM_PARAMETERS];
} EXCEPTIONREPORTRECORD;
// define pointer to above
typedef struct _EXCEPTIONREPORTRECORD *PEXCEPTIONREPORTRECORD;
```

Thus, the operating system provides a stack for registering exception handlers, API services for accessing FS:[0] (as it may not be accessed directly), a context descriptor for describing the current state of the machine, a function pointer for specifying a particular routine to handle the exception, and a mechanism for indicating whether a handler desires to handle a particular exception. It is therefore important to understand that additional features of exception handling, such as syntax and exception codes, are implemented on top of the underlying OS mechanism—that is, they are not provided by the operating system. The key words try/except and try/finally, therefore, are not defined or otherwise provided by the operating system. Instead, these EXCEPTION_MAXIMUM_PARAMETERS is specified by the OS. For purposes of subsequent discussion, "ERR" will be used to refer to Exception Registration Record (that is, ERR is a stack variable of the type EXCEPTIONREGISTRATIONRECORD or derived therefrom that is being hooked into the OS exception handling chain by the program).

Based on the EXCEPTIONREPORTRECORD, an EXCEPTIONREGISTRATIONRECORD may be defined as:

```
// Exception Registration Record
typedef struct __EXCEPTIONREGISTRATIONRECORD;
{
    PEXCEPTIONREGISTRATIONRECORD ERRprev;
    __ERR *ERRhand;
// any number of user-defined data may follow here
} EXCEPTIONREGISTRATIONRECORD;
// define pointer to above
typedef struct __EXCEPTIONREGISTRATIONRECORD
                            *PEXCEPTIONREGISTRATIONRECORD;
```

A record for tracking the context of the exception (i.e., a CONTEXTRECORD) is defined by the particular OS, as indicated:

```
typedef struct __CONTEXT
{
    // macine state (OS and CPU dependent)
} CONTEXTRECORD;
// define pointer to above
typedef struct __CONTEXT *PCONTEXTRECORD;
typedef unsigned long handlerType(PEXCEPTIONREPORTRECORD,
PEXCEPTIONREGISTRATIONRECORD, PCONTEXTRECORD, PVOID);
#define XCPT_CONTINUE_SEARCH 0 // exception not handled
#define XCPT_CONTINUE_EXECUTION -1 // handled, resume execution
```

For embodiments operative under MS-DOS and 16-bit Windows (Win16), these exception support functions are not supplied by the OS and are, therefore, implemented via an exception handling runtime library. Since the OS in the case of MS-DOS and Win16 is not aware of the presence of exception handling, additional care is taken, for instance, when throwing an exception from a Windows call-back function.

B. Structured Exceptions

1. Function prolog/epilog

The Exception Registration Record, ERR, will now be described in further detail. In a preferred embodiment, ERR may be constructed as follows:

```
struct    ERRbc
{
    PERR           ERRcPrev;        // previous ERR
    catchPtrTP     ERRcCatcher;     // address of handler
    EXCTABPTR      ERRcXtab;        // context table addr
    unsigned       ERRcSPsv;        // saved (E)SP value
    unsigned short ERRcCCTx;        // current context
#ifndef __FLAT__                    // 16-bit programs only
    unsigned       ERRcDSsv;        // saved DS value
    unsigned       ERRcSIsv;        // saved SI value
#endif
#ifdef SUPPORT_STRUCTURED_C_EXCEPTIONS
    struct
    {
        unsigned short ERRcUnwind;  // unwinding flag
```

```
    unsigned long   ERRcExcCode;    // exception code
    void __ss       *ERRcExcInfo;   // exception infor ptr
    }                   ERRcInfo;
#endif
    dtorCntType     ERRcInitDtc;    // entry dtor count
};
```

Referring now to FIG. 3, the process of hooking into the OS exception chain using ERR records is illustrated. Each function receives function prolog and epilog code, as shown. At the prolog, the address of the function that will handle any exceptions that arise for this frame is stored in the record as a function pointer to a handler, shown at 310. Then, the current head of the list is now stored in the previous pointer (for the record being added), as shown at 320. The record is inserted at the head of the list, with the old head of the list stored in the previous pointer (of the new record) before the new record is assigned into the head of the list. A frame is unhooked from the list by simply restoring the old head of the list, as shown at 330.

Exemplary machine instructions for constructing basic exception handling function prolog/epilog are as follows:

```
line  1  mov  dword ptr [ERR.ERRcCatcher],offset __ExceptionHandler
line  2  mov  dword ptr [ERR.ERRcXtab],offset context_table
line  3  mov  dword ptr [ERR.ERRcSPsv],esp
line  4  mov  word ptr [ERR.ERRcCCtx],0
line  5  mov  eax,dword ptr fs:[0]
line  6  mov  dword ptr [ERR.ERRcPrev],eax
line  7  lea  eax,ERR
line  8  mov  dword ptr fs:[0],eax
```

As shown, the address of the exception handler (which is defined by the runtime library) is stored in the ERR (line 1). Then, the address of the context table (described below) is assigned at line 2. The current stack pointer value is saved (line 3), and the current context value is set to 0 (line 4). The current value of the OS exception handling chain is saved in the ERR (lines 5 and 6), and finally the now complete ERR is inserted into the OS chain (lines 7 and 8).

When a function that contains an exception handler returns, it removes the ERR from the chain by restoring the previous value of the head of the list:

```
line   9  mov  eax,dword ptr [ERR.ERRcPrev]
line  10  mov  dword ptr fs:[0],eax
```

A modified (smaller) version of the prolog/epilog may be constructed as follows:

```
push    ebp                          ; keep ERR at end of stack
mov     ebp,esp
sub     esp,<frame size>
push    <callee-saved regs>
push    0                            ; set current context to 0
                                     ; zero out current context & ab term flag
push    offset __func__EH__stub      ; addr of exception handler
push    dword ptr fs:[0]             ; previous chain address
mov     dword ptr fs:[0], esp        ; insert ERR into chain
                                     ; ESP now points to ERR!
```

The above sequence places the ERR at the bottom of the stack. The value in FS:[0] can be used to determine the ESP (Extended Stack Pointer register) value for the function body (provided the sequence is inserted after the stack space for locals has been allocated, and any register saves have been performed). Note that the above sequence limits the size of the ERR, since reserving space for any more fields would add to the overhead. Thus, only the OS-defined fields are initialized plus the "current context" field (which is initialized in the prolog anyway). Any additional ERR fields are then allocated as a separate local object, whose stack offset is stored in the context table so that the RTL can access it (this would be used for things such as the exception code/info pointer variables and the abnormal termination flag). In the case of a C++ ERR frame, the destructor count value on entry would also be pushed as part of the prolog (as described before for the destructor count).

The __func__EH__stub label points to a jump stub that the compiler generates for the function; the stub loads up any other values (e.g., the address of the context table) that are needed in the exception handler, and then transfers to the exception handler in the runtime library. In other words, the stub factors out any code that is per-function in basis, but does not change from one invocation of the function to another. An example of such a jump stub is:

```
__func__EH__stub:    mov ebx, offset context__table
                     jmp __ExceptionHandler
```

To restore the previous OS handler chain value before returning from the function, one can take advantage of the fact that the saved FS:[0] value was the last value pushed on the stack and generate the following shortened exception handling prolog/epilog code:

```
; Since ERR is at bottom (or top) of stack
; can remove by popping it
pop     dword ptr fs: [0]
mov     esp,ebp
pop     ebp
ret
```

Return statements require added attention. Any time a program exits a function, if that function has hooked itself into the exception chain it must unhook itself whenever it exits (i.e., executes a "return" statement). Otherwise, a dangling exception record will be left—one pointing to a non-existent stack frame. Thus, the compiler must insert the epilog code not only at the bottom of the function but also at return statements which may occur throughout the function. In this manner, cleanup upon return also includes restoring the exception registration chain.

2. Context Table

The context table is used to keep track of which part of a given function code is executing. When a function body is executing and an exception occurs at some random point, the context table allows the system to determine what part of the function was executing, what cleanup is necessary before the stack frame may be thrown away, and whether there exists any try blocks that are active. For a given function body, a context table is constructed which describes the effective layout of the function (e.g., what are its try blocks, what are its inner blocks, and the like). The Exception Registration Record (ERR) includes a variable which stores an offset into the context table that describes where the function is currently executing. For instance, when the program is executing a particular try block, the corresponding entry in the context table is pointed to; at the conclusion of executing the try block, this is reset to point to the containing (outer) block.

When an exception occurs at runtime, the exception handling runtime library of the system grabs the current value from the stack frame of the current context offset and indexes into the table for determining the current context (e.g., processing a particular try block). Thus in addition to the two fields previously described for the Exception Registration Record (i.e., pointer to previous record and address of the handler—the two fields which the operating system knows about)—a preferred embodiment of the present invention also defines a third field: the offset referencing the current context entry. During program execution, compiler-inserted code makes the necessary assignments to keep the current context up to date.

As executing code enters and exits exception handling blocks, the current context offset field in the ERR is adjusted appropriately. Since all of the context table entries are not necessarily the same size, the current context is represented as an offset into the context table; the offset 0 is used to represent "no context" (i.e., execution is not in an "interesting" part of the function). This works because no entries are ever located at offset 0 in the context table. Each entry in the context table describes a single exception handling block; due to the nature of C and C++, these can be nested similarly to function blocks. Since the system always works its way out from the current block, it is sufficient to encode the outer (enclosing) context offset for each block.

As illustrated in FIG. 4, an exemplary context table may be constructed as follows (table/entry):

```
struct               CXtable
{
        void *               exceptSpec;
        unsigned             ERRstackOffs;
        CXentry              entries[];
};
struct               CXentry
{
        unsigned short       outerOffs;
        unsigned short       contextKind;
        // other optional fields may follow
};
```

The context table 400 consists of three fields. The first field, the exception specification 401 (exceptSpec), lists the particular exception types which may be thrown for this function—a table of types that constitute the exception specification for the function. The field either stores zero (i.e., no specification) or it points to a table of exception types (that can be thrown). This list is checked whenever the function's frame is about to be unwound: during stack unwinding when control is passed to the particular exception handler which is about to throw the function away (i.e., unwind its stack frame), the exception specification value is checked. If the value is non-zero, the system checks the type of exception that is causing the stack frame to be unwound and compares it against the list. If it is not on the list, then the system calls a default function, unexpected().

The second field, the ERR stack offset field 403, gives the offset within the stack frame of the exception registration record. When the operating system calls a particular handler asking whether it wants to handle the exception, it passes the flat address of the ERR. In order to access a particular function, the system must determine what its stack frame is instead of storing the EBP (base pointer value). In a preferred embodiment the distance from the EBP to the ERR at compile time is determined and placed in the table at field 403. Thus, the ERRstackOffs field 403 is used to compute the proper stack frame value for the function at runtime: subtracting the value of this field from the offset of the ERR itself yields the proper [E]BP value.

The last field the context table stores any number of context entries, such as try/except and try/finally, which comprise the function body. FIG. 4 illustrates the layout of a context entry 410. Since the context table mimics the structure of try blocks and other blocks of the function, it should encode any nesting. Thus as shown in FIG. 4, each entry includes an outer offset field 411, outerOffs, for encoding this nesting information. The outerOffs field allows the containing context to be located, once the current context has been dealt with. In this manner, every context table entry has the offset of the surrounding one (if any). Consider, for instance, a try block nested three deep. If an exception occurs, once the inner-most try block is processed the system then examines the other try blocks to see if any more are interested in handling the exception.

The second field of the context entry is context kind field 413, contextKind, which stores one of the following values:

```
enum
{
    XB_FINALLY,     /* 0 try/finally          */
    XB_EXCEXP,      /* 1 try/except (expr.)   */
    XB_EXCCNS,      /* 2 try/except (const)   */
    XB_TRYCPP,      /* 3 try                  */
    XB_CATCH,       /* 4 catch                */
    XB_DEST,        /* 5 destructor cleanup   */
};
```

This field simply describes whether this is a try/except, try/finally, destructor cleanup, try/catch, or the like. As illustrated in FIG. 5, try/except structured exceptions require additional fields 500 for describing how the filter expression is to be evaluated (i.e., how the syntax works). If the filter expression returns a value indicating that it wants to handle the expression, then an address of where to jump to to handle the expression must also be provided, as shown.

3. Try/Except Structured Exceptions

Figure 6:
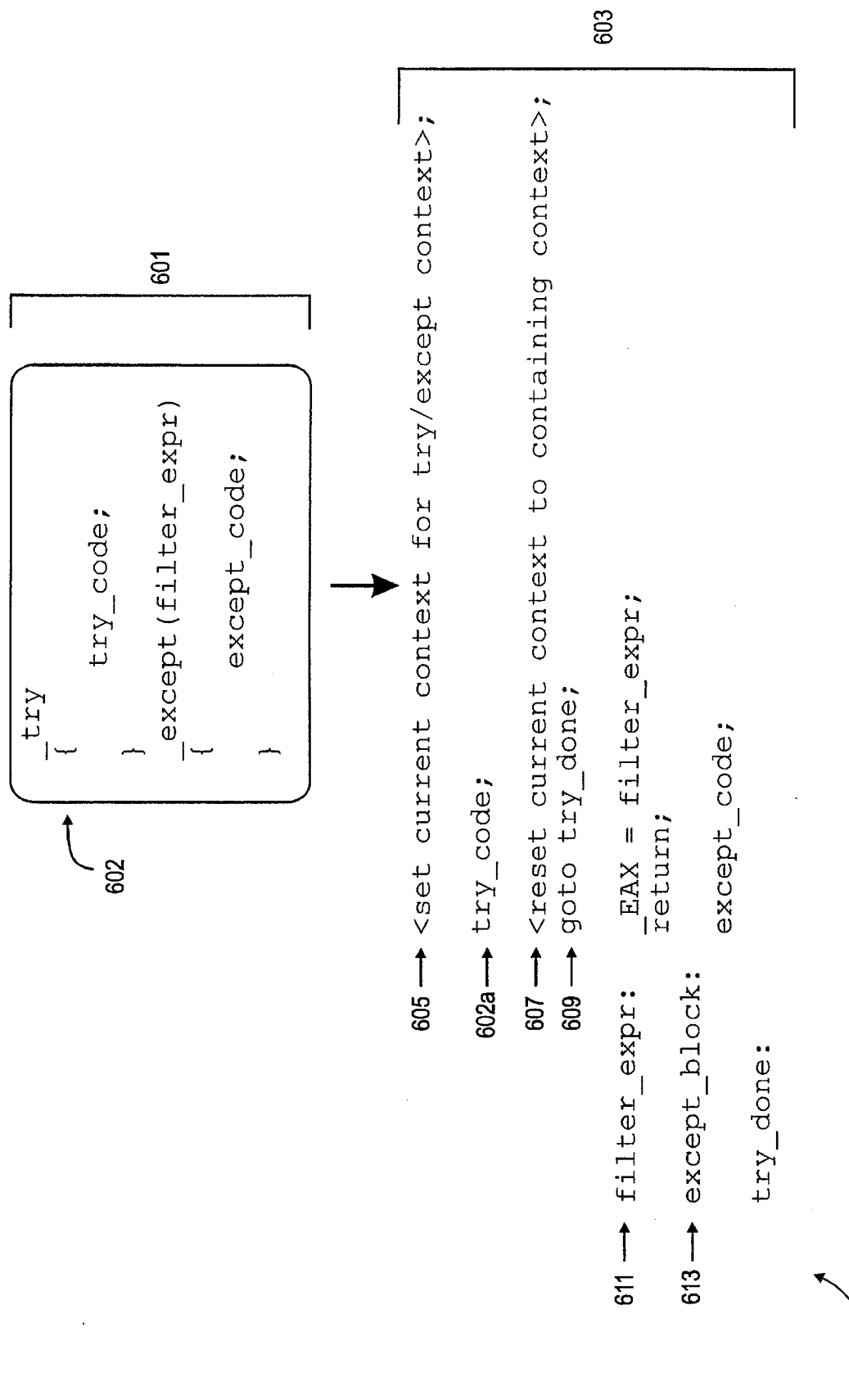
FIG. 6 is a diagram illustrating translation of try/except constructs into corresponding executable machine instructions.

FIG. 6 illustrates a general try/except method 600 of the compiler for converting source listing 601 (which includes a user's try/except block) into compiled code 603. The compiler creates an entry in the context table which corresponds to the try block 602. As shown, before execution of the compiled code for this try block (at 602a), the compiler inserts an assignment which sets the current context value for this try block. The runtime exception handler will know, if there is an exception, that the system is currently executing the try block. The assignment is shown at 605. The compiler inserts code for resetting the current context to the containing context, as shown at 607, which is executed if all goes well, i.e., no exception occurs. If this were the outermost try block in the function, the context would simply be set to zero. As shown next, the compiler inserts code (goto try_done), for skipping the except block for this try block.

Should there be an exception, however, the entry in the context table will point to the label, filter_expr, that will evaluate the filter expression; recall that the filter expression is something which the user programmer writes in the source code. Therefore, if an exception occurs while execution is still within the try block (so the current context is still set to this try block) the runtime exception handler will make an indirect call to pass execution to the filter_expr label 611. Here, the system computes the value of the filter expression, loads it into the EAX register, and returns back to the runtime exception handling library. The runtime library, in turn, examines the value for determining whether the exception handler wants to handle this particular exception. If it does, then the runtime exception handling library will call the operating system to unwind all stack frames that were added after this function was called. Once that is done, a jump is made to the except_block label, for executing the body of the handler.

Sometimes, when execution leaves an exception handling context, it is possible to avoid having to reset the current context field to the outer context. One example of this case is a C++ destructor cleanup context (explained in further detail below) that is a nested block, where there are no exception handling constructs that follow such a nested block within the outer block. Consider, for example:

```
void f (int x)
{
    foo     outer_var;
    if  (x)
    {
        // point 1
        foo     inner_var;
        // point 2
    }
    // point 3
    // other code
}
```

When the code that follows point 3 does not declare any local objects, the current context value can be left equal to the nested block even when execution leaves that block (at point 2). This is because the destructor cleanup tables enable the runtime library code to detect that execution has already left the inner block, and that inner context can be safely skipped. Should any exception handling blocks need to be created after point 3, the current context should be set (this would be done at the last possible moment, only just before the additional exception handling code). There will typically be code at point 1 to set the current context value for the inner block.

4. Goto's and Return's

Whenever execution leaves a function that contains exception handling constructs, the function's ERR is removed from the OS chain. Furthermore, if the function is being exited from inside a C++ catch block or the try block of a C try/finally construct, additional cleanup is necessary. In the case of a catch block, the descriptor of the caught exception is cleaned up, and in the case of a try/finally block, the finalization code is executed.

Similarly, when a goto is used to transfer out of an exception handling construct, the current context value is usually set to the value appropriate for the target of the jump. Additionally, if the goto is out of a catch block or the try block of a finally construct, proper cleanup is performed.

For the purpose of performing the cleanup described above, the following function is provided by the runtime library:

void _Local_unwind (ERRptr err, unsigned target);

where the err parameter gives the ERR for the current function, and the target parameter specifies the target context of the jump. The library also provides:

```
void _Return_unwind(ERRptr err);
``` which is equivalent to _Local_unwind(p, 0), in that it cleans up all the currently active contexts. This is used as a short-hand prior to returning from a function, or when jumping to a label that lies outside of all exception handling blocks.

5. Try/Except Block Types

There are two types of try/except blocks: those with a constant filter expression (this is typically a positive value, i.e., the user wants to handle all exceptions), and those except blocks whose filter expressions are to be evaluated at runtime.

Following is an exemplary context entry for a try/except block with a constant filter expression:

```
struct           CXentryExceptConst
{
    unsigned short   outerOffs;
    unsigned short   contextKind;    // = XB_EXCCNS
    unsigned         filterValue;
    void      *      blockAddress;
};
```

For non-constant filter expressions, the address of the code that computes the filter value is stored instead:

```
struct           CXentryExceptExpr
{
    unsigned short   outerOffs;
    unsigned short   contextKind;    // = XB_EXCEXP
    int              (*filterExprPtr) (void);
    void      *      blockAddress;
};
```

The filter expression code is generated as a function body taking no parameters; it returns the filter expression value. The exception information variables that can be accessed in a filter expression or inside an except block are implemented as variables within the ERR that are assigned by the runtime library (before invoking the filter expression or jumping to the except block). The compiler recognizes references to these variables and maps them into the appropriate members within the ERR.

5. Try/Finally

Figure 7:
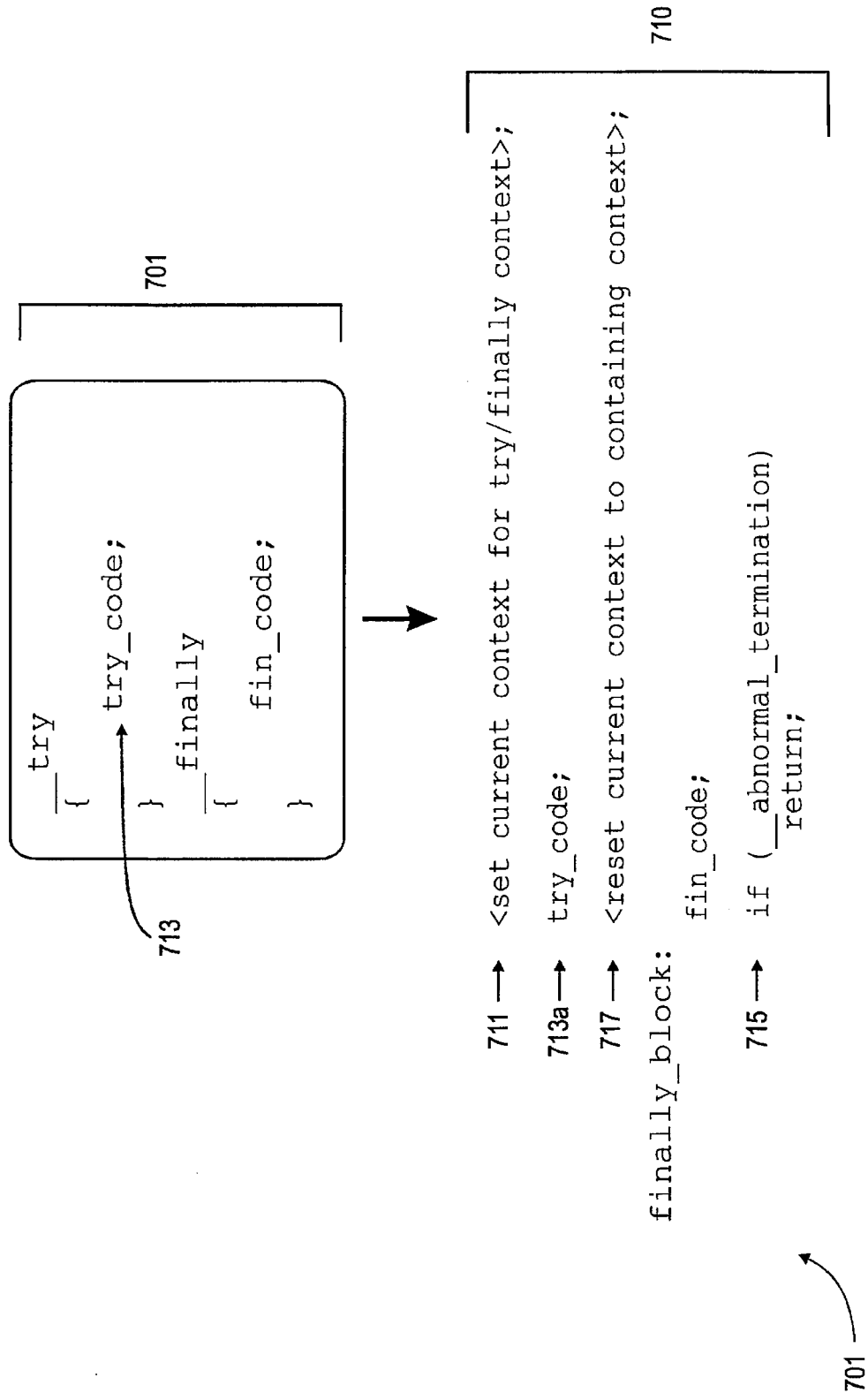
FIG. 7 is a diagram illustrating translation of try/finally constructs into corresponding machine language instructions.

Execution of try/finally, which is similar to try/except, is illustrated by the try/finally block 700 in FIG. 7. The only difference is that there is no filter expression (as there was for the try/except syntax). The context entry for a try/finally block is defined as follows:

```
struct           CXentryExceptExpr
{
    unsigned short   outerOffs;
    unsigned short   contextKind;    // = XB_FINALLY
    void      *      reserved;
    void      *      blockAddress;
};
```

The field for the filter expression address is removed (or is unused). Otherwise, the context table entry for the try/finally embodiment is essentially the same.

The bottom half of FIG. 7 illustrates translation by the compiler of source listings 701 (which includes a programmer's try/finally block) into compiled code 710. The code of a try/finally block is transformed as follows:

```
_try
{
    try_code;
}
_finally
{
    fin_code;
}
``` translated into:

```
<set current context value for the try/finally context>;
try_code;
// here execution simply 'falls through' to the finally block
finally_block:
// entry point used by the run-time library
fin_code;
if    (abnormal_termination)
          return;
<reset current context value to containing context>;
```

A finally block never "catches" an exception. The purpose is instead as follows. When an exception occurs which causes the stack frame to be unwound the finally block is defined (syntatically) to guarantee that certain cleanup code will be executed. Once a try block is entered, therefore, no matter how execution exits that block (e.g., jump, return, long jump, or exception) the finally block (which the user programmer writes) is guaranteed by the syntax (compiler) to be executed.

The transformation, which is simpler than the try/except case, is as follows. As shown at 711, the current context for the try/finally block is set—the compiler allocates an entry in the context table for this block. Next, the try code 713 is executed. The compiler includes code such that upon function entry a flag, abnormal_termination, is set to 0. The abnormal_termination flag or variable maps into the appropriate member of the ERR structure; the flag is actually another field in the Exception Registration Record. If no exceptions occur, the value of abnormal_termination remains 0. The finally block tests the flag, as shown at 715. If its value remains 0, the finally block just continues execution (to code following the try block). After the try code but before the finally block, the compiler inserts code to reset the current context to the containing context.

If an exception occurs during execution, the runtime exception handling library will set the abnormal_termination flag to 1 (in the ERR) and then call the finally block label. The code will execute and then return back to the runtime exception handling library, since for this pass the abnormal_termination flag is non-zero. In this manner, the finally code is executed when the stack is being unwound.

Figure 8:
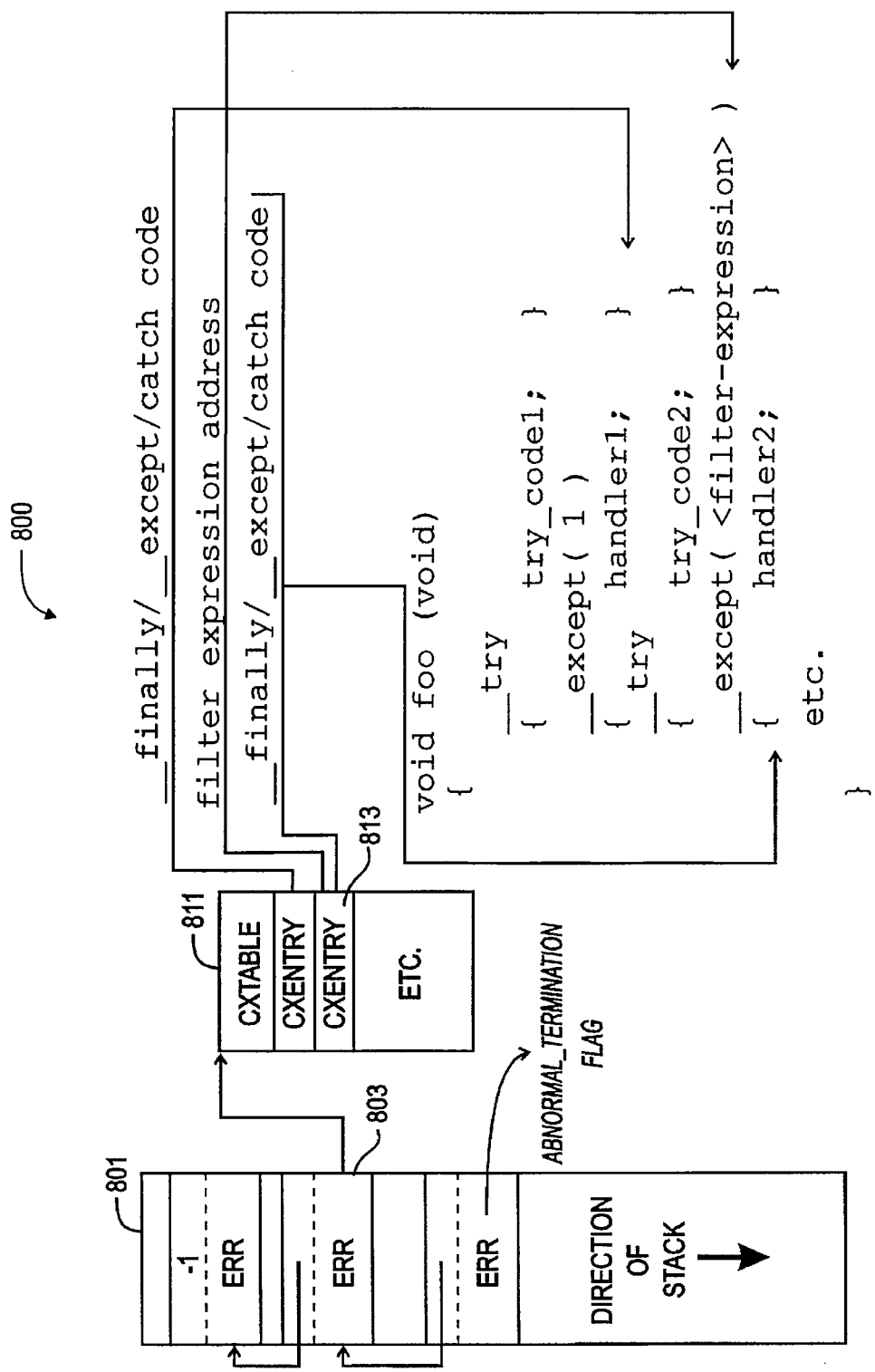
FIG. 8 block diagram illustrating the relationship between the exception registration records (ERR) as they reside on the system stack, the context table having a plurality of context entries, and the various exception handling contructs as they appear in source listings.

The relationship between an ERR record (in the ERR chain), a context table and its entries, and user code is shown in FIG. 8. Specifically, system stack 801 stores a plurality of ERRs (in addition to other stack objects). The ERR for each function points to its context table, for instance, ERR 803 points to context table 811. The context table has entries, such as entry 813, which describes things within the function body. Specifically, each entry in the context table has a pointer that points into the function. If a function has, for example, two try/except blocks, then there would be two context table entries which would point to handlers as shown.

When executing a try/finally block, once the try block is entered, the finally block must be (according to the syntax)

executed no matter how execution of the try block is terminated. Consider, for instance, a situation where within the try block another function is called which performs a longjmp (which may jump to code far removed from the current try/finally block). Regardless, the syntax of try/finally guarantees that the finally block must be executed.

In a preferred embodiment, the problem is handled as follows. In setjmp, the value of FS:[0] is saved so that the currently-active exception handler is known; for the stack frame, the current exception context value is saved. The current context exception value should be captured because when the longjmp is executed the program may be executing in a nested block in the same function; this allows the system to go from the nested block to the location of setjmp.

The operation is illustrated in further detail in FIG. 9. Consider, for example, function 900 which includes a setjmp and a try/finally block. As shown, the function includes a setjmp call 901 which will transfer execution to the specified jump buffer (jmp) under programmer-specified conditions. The function includes a try block 905 and a finally block 908. Suppose that the try block calls a function which performs a longjmp (for this jmp buffer). In such an instance, the stack still must be unwound, as well as calling any intervening try/finally blocks. This is why the current exception list value is saved and why a global unwind is performed—calling the operating system service which unwinds all subsequent stack frames as well. This, in turn, causes the try/finally blocks to be executed as well.

Recall that in a try/finally block, the finally block is (syntatically) guaranteed to be executed. Thus for the try block 905, the finally block 908 must be executed. To achieve this, the system employs a "local unwind." The saved exception context (which corresponds to the if statement 910) is compared to the one which is in effect for the function 900 at the time of the unwind. If they are different, then a local unwind is performed to remove stack frames until a call to finally 908 can be made.

C. C++ Exceptions

1. Runtime Type Identification

Before discussing C++ exception handling, it is helpful to review Runtime Type Identification (RTTI), which is a recent addition to the ANSI/ISO C++ specification. Runtime Type Identification makes it possible to write portable code that can determine the actual type of a data object at runtime, even when the object has access only to a pointer or reference to that object. A type descriptor is provided for a given type and stores information such as the name of the type, its size, whether it is a built-in type or a user-defined type such as an array, struct/class/union, or enum. RTTI makes it possible, for example, to convert a pointer to a virtual base class into a pointer to the derived type of the actual object. See, for example, Borland C++: Programmer's Guide (Part No. BCP1240WW21771), page 110, for an example of a dynamic_cast operator which uses runtime type information.

The RTTI mechanism allows one to check whether an object is of some particular type and whether two objects are of the same type. This is done with a "TYPEID" operator, which determines the actual type of its arguments and returns a reference to an object, instantiated from TYPE_INFO, which describes that type. One can also use a type name as the argument to TYPEID, and TYPEID will return a reference to const TYPE_INFO OBJECT for that type. The class TYPE_INFO provides an operator == and an operator != that can be used to determine whether two objects are of the same type. Class TYPE_INFO also provides a member function "name" that returns a pointer to a character array that stores the name of the type.

Figure 10A:
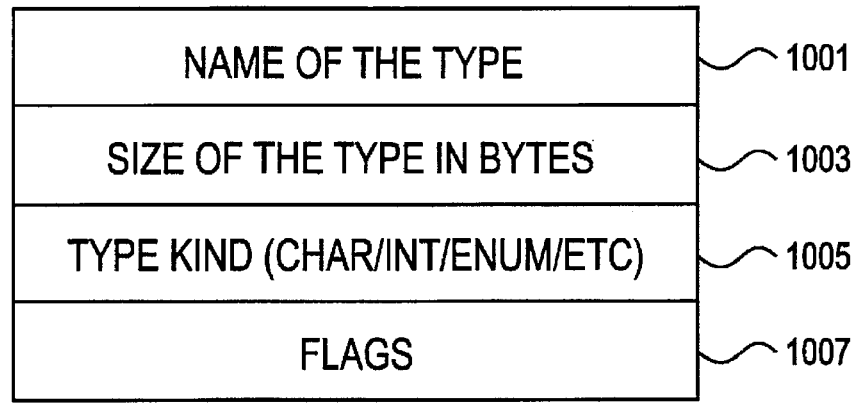
FIG. 10A is a block diagram illustrating C++ type descriptors, shared with Run-time Type Identification (RTTI), which are employed for C++ exception handling.
Figure 10B:
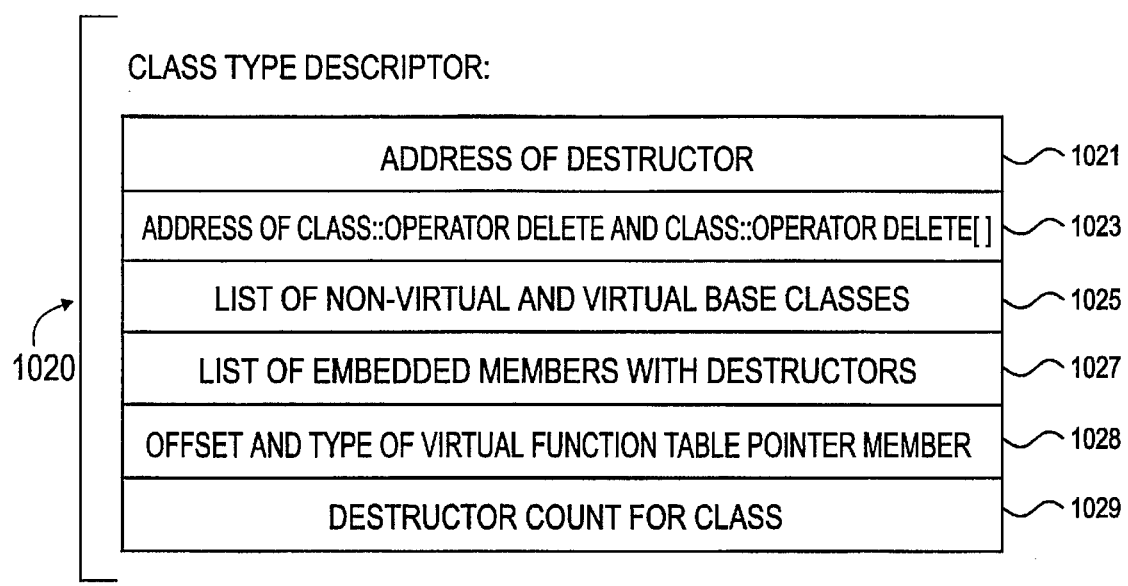
FIG. 10B is a block diagram illustrating a C++ class type descriptor.

In a preferred embodiment, whenever C++ exception handling support needs to refer to a type in any way (e.g., whether describing what type a "catch" is, what type a thrown exception is, what type an object is which needs cleanup, or the like) the type descriptor of the Runtime Type Identification is employed. In other words, the same data structures ("type descriptors") used by the Runtime Type Information (RTTI) subsystem are used for C++ exception handling. For class types, the type descriptor contains the following fields:

1. Address and calling convention of the destructor
2. Address and calling convention of class::operator delete and class::operator delete[] (if declared by the user)
3. List of non-virtual and virtual base classes
4. List of embedded members with destructors
5. Offset and type of the vtable pointer member
6. Destructor count for the class FIG. 10A illustrates the contents of an exemplary C++ type descriptor 1000. Contents (shared with RTTI) include a name of a type 1001, a size of a type 1003, a type kind 1005, and flags 1007. FIG. 10B illustrates contents of a C++ type descriptor 1020 which describes a C++ class. The descriptor 1020 includes an address of the destructor 1021, an address of the class delete operator 1023, a list of base classes 1025, a list of embedded members with destructors 1027, an offset and type of the virtual function table pointer member 1028, and a destructor count for the class 1029. With an understanding of how types are described, the reader may understand the teachings of the present invention for implementing C++ exceptions.

In the following discussion, tpdscPtr will be the type used to refer to type descriptors. In order to compare two type descriptor addresses for equality, it is not sufficient to compare the pointer values, as it is possible that a given type will have more than one copy of its type descriptor created in a given program (for example, one copy may be created in an executable, and another in a DLL the program uses). Therefore, when two type descriptor pointers compare unequal, further tests are made. This can be as simple as comparing the name strings (taking care to distinguish different local types with the same name). Since string comparisons can be slow, one may wish to speed up this process. One way to do that is to store a hash value (computed from the type name string) in the type descriptor, and compare the full strings only when the hash values match. Another way is to make all of the type descriptors known to the runtime library, and have the RTL build a complete table of types at startup time (and at DLL load time); each type gets assigned a unique ID, and comparing two type descriptor pointers then becomes a simple compare of their IDs. The drawback of this approach is that building the type table may take a lot of time and space, so it may be better to do this in a "lazy" fashion, i.e., adding type descriptors to the global table when they are compared the first time.

2. Try/Catch

When an exception is thrown (via a throw expression), a copy is made of the value thrown, and the address of this copy is passed along with its type (and some flags) to the runtime library. The RTL packages up the C++ exception so that it can be raised as a C exception (with a special exception code).

Each try/catch block is described with an entry in the context table. FIG. 11 illustrates an exemplary context table entry 1100 for a try/catch block. The following describes the context entry for a try/catch block; the type HTD (which describes the handler table) is explained in detail below:

```
struct        CXentryCPPtryCatch
{
    unsigned short    outerOffs_try;
    unsigned short    contextKind_try;       // = XB_TRYCPP
    HTD         *     catchHandlerTable;
    unsigned short    outerOffs_catch;
    unsigned short    contextKind_catch;     // = XB_CATCH
};
```

When the exception handler encounters a C++ try context, and the current exception being handled is a C++ exception, it tries to match the type of the thrown value against the list of catch types that is pointed to by the try/catch context. The context table entry 1100 includes a catch handler pointer 1101 which points to a table of catch descriptors (described below). As shown, the context table entry 1100 comprises the try fields 1103 immediately followed by catch fields 1105. This approach simplifies the task of cleaning up the argument to the catch block. If a class is passed by a value, for instance, then the destructor for the class must also be called.

The catch handler pointer 1101 points to the catch handler table 1200, shown in FIG. 12. The format of the catch handler table is as follows:

```
struct    HTD
{
    unsigned    HTDargAddr;     // stack offset of handler arg
    unsigned    HTDargSize;     // size of handler arg
    HD          HTDtable[];     // table of handlers
};
struct    HD
{
    void    *    HDhndPtr;      // addr of handler code
    tpdscPtr     HDtypeID;      // type of the handler
    unsigned     HDflags;       // const/volatile/unnamed/etc.
    void    *    HDcctrAddr;    // copy-ctor address
    unsigned     HDcctrMask;    // copy-ctor calling convention
};
```

It describes for all the catches attached to the try block what their types are. In particular, each catch handler entry 1210 includes a pointer 1211 storing the address of where the actual code is for the catch, and includes a typeID 1213 which is the type of argument specified by the user (e.g., char, int, and the like). Entry 1210 also includes flags 1215 which specify whether the argument to the catch is constant, and also includes a pointer which stores the address of the copy constructor (for a class). This latter field allows one to catch a class by value; the copy constructor will copy the throw value onto the stack and initialize it. Destructor Address 1217 stores a pointer to the destructor. The last field, Mask field 1219, simply specifies its calling convention (e.g., CDEL, PASCAL, or the like).

FIG. 13 illustrates transformation of source listings 1310 which comprises C++ code having a try block with two catch blocks, into compiled code 1320. As shown, the compiler inserts instructions at 1321 for setting the current context for the try/catch block. Next, the try code 1323 is executed. If no exceptions occur, then compiler-inserted instructions 1325 are executed for resetting the current context (to the outer context). In this instance (of no exceptions), execution jumps (shown by the goto label at 1327) to catch_done, shown at 1329.

With an exception occurring, however, execution is modified as follows. The runtime exception handling library accepts a current context (for identifying the current try/catch block). From the context table, the corresponding entry for this try/catch block may be found. From this entry, the address of the handler table may be determined. Next, the handler table is scanned to locate a handler whose type matches the type thrown (using the above-described type descriptors). Once an appropriate catch block for handling the exception is determined, then the stack is unwound to throw away the extra stack frames. The catch argument is then initialized with the thrown value; any necessary copy constructor (e.g., for a classify value) is called. Execution control is then passed to the catch block, such as catch block 1331. Here, programmer-written code executes for handling the exception. Before the jump to the catch block is made the current context value is incremented to that it points to the catch descriptor, since execution is in the catch block not the try block. After the user code has executed, the program jumps (shown as goto label 1333) to catch_cleanup, shown at 1335. At this point, any necessary cleanup for the runtime exception handling library is performed, such as de-allocating memory which was allocated for handling the exception. At this point, the exception has been completely handled.

All of the catch arguments for a single try/catch block share the same location on the stack, which is large enough to hold the largest catch argument type. When a matching catch clause is found, the stack is unwound to the matching try/catch context, the catch argument in the function's stack frame is initialized with the thrown value. This, of course, may involve a copy constructor call, or a conversion of a class pointer to a pointer to one of its bases.

The current context value in the function's ERR is advanced so that it now indicates that the catch block is executing (this is why the catch context entry is shown to always immediately follow the context entry for the try). Finally, the runtime library transfers control to the catch block's body.

When a class is thrown by value, the copy of the thrown value should be destroyed at some point. Since it is possible to re-throw from a catch block, and this should re-throw the original value, the original thrown value can be destroyed at the point where the catch argument is initialized. When the catch argument is declared const (or is unnamed) and its type exactly matches the thrown type, a re-throw can use the value of the catch argument rather than the saved copy. In other cases, the thrown value can be destroyed at the end of the catch block.

Whenever execution leaves the body of a catch block (whether by reaching the closing "}" or via a goto/return statement), the runtime library is notified that the exception is now handled via a call to the runtime library routine _CatchCleanup(void).

3. C++ Destructor Cleanup

Each C++ block that contains variables or temporaries of type "class with destructor" gets assigned an exception handling context by the compiler. Such variables and temporaries will be referred to as "object variables" for the purposes of the following discussion.

The state of construction/destruction is tracked by having each constructor increment and each destructor decrement a global variable (denoted as a "destructor count" herein). Thus, the destructor count is a device for keeping track of what objects (i.e., global or local variables) have been constructed so far in a module or function. If an exception occurs when still in the function, the system may determine how many objects in that function need to be cleaned up (i.e., their destructors are called).

On entry to a function, the current destructor count is recorded in the function's frame, so that if an exception occurs while the function is executing, it is possible to determine which object variables need to be destroyed by subtracting the recorded initial destructor count from its value at the point where the stack frame is being unwound; this value is the relative destructor count. Of course, not all blocks in a function will start with the same destructor count value, so a destructor cleanup context descriptor contains a value by which the destructor count is to be adjusted (in addition to the adjustment by the function's initial destructor count), to get the proper relative destructor count value for the particular block.

As described above, it is possible that execution has already left a given destructor cleanup context, even though the current context is still set for it. This is easily detected when the relative destructor count is computed for a block: if the relative value is not positive, that block is simply skipped.

When a block is encountered with a positive relative destructor count value, its table of object variables is used to determine which ones need to be destroyed. Note that a given variable may only be partially constructed; in that case, the runtime library should determine what sub-objects (i.e., base classes and/or embedded object members) of the variable have been constructed so far, and only call destructors for those sub-objects (this is where the fields of the type descriptor that describe base classes and embedded objects is used).

Special handling is required for calls to functions that take class arguments by value as well as functions that return a class by value. For class arguments, a separate cleanup region is created that covers the code that constructs the argument values. After all arguments have been constructed, just before the function is called, another context is entered which does not include entries for the arguments themselves. This is because functions are responsible for cleaning up their arguments. Similarly, when constructing a class return value, a separate region is created when temporary objects are created in the return expression, so that proper cleanup can take place.

When an array is being allocated (via new) whose dimension is not known at compile time, the runtime library should know how to locate the element count stored there by the new operator. Otherwise, cleanup for arrays is straightforward, since the RTL knows the type (and destructor count) of the element type, as well as the number of elements. All calls to a copy-constructor or destructor from the runtime library should be wrapped in try blocks, so that terminate() can be called in the case of a copy-constructor or destructor throwing an exception.

Referring now to FIG. 14A, operation of the destructor count will now be described in further detail. As shown for an exemplary class 1401 (e.g., "foo"), the class constructor and destructor are modified for tracking the destructor count. Specifically, constructor 1401 is modified to include an incrementing instruction 1403, for incrementing the destructor count. In a like manner, destructor 1405 is modified to include a decrementing instruction 1408, for decrementing the destructor count upon destruction of the object.

Figure 14B:
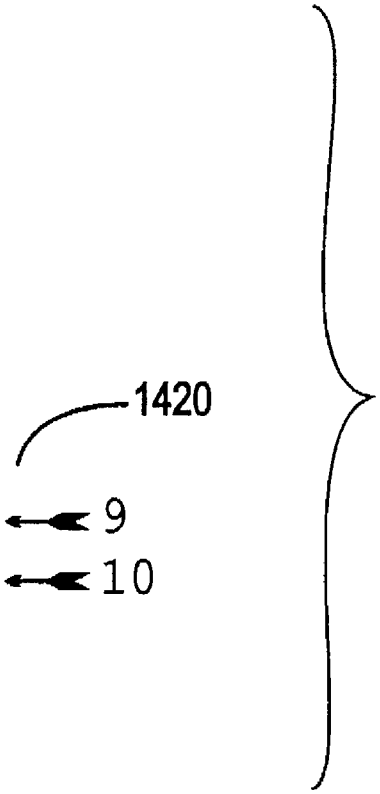

Consider, for instance, function f shown in FIG. 14B. As shown, upon entry into function f, the destructor count is 5. As each new object is created (e.g., objects a, b, and c), the destructor count is incremented. Upon entry into the function, the then-present destructor count is saved. In this manner, the number of objects created for a particular function may be known at a given instance in time. After creation of object c, for instance, the destructor count is 8; the number of objects created for this function is 3 (8–5). Any block which has variables which require destruction gets an entry in the context table. The entry contains a pointer to a cleanup table (described below) and a relative destructor count—relative to the beginning of the function.

Suppose that the function f of FIG. 14B includes an additional block having local variables, such as block 1420. As shown, upon creation of object x, the destructor count is equal to 9, and upon creation of object y, the destructor count reaches 10. Relative destructor counts for this block would be stored in a separate context table entry (than that above). For block 1420, destruction of its variables (with decrementing of the destructor count) would still indicate outstanding variables to be destructed, since 10 (the destructor count) minus 5 (the function-relative destructor count) is equal to 5. In this manner, the system knows that there are still three other objects which require destruction. Thus, the value of 3 represents the value to adjust the destructor count for determining the number of objects which require destruction in block 1420.

Referring now to FIG. 15, construction of the destructor cleanup variable (object) table will be described; context table entry 1500 is also shown. Table 1550 stores a first field 1551 referencing the type descriptor for this object. It also includes flags 1553, for internal housekeeping. Finally, it stores an offset 1555, which stores the address in the data segment for global variables or stores a stack offset for auto variables.

Use of the destructor count for variable (object) cleanup is illustrated in FIG. 16. The figure illustrates a function 1600 which includes various objects which are instantiated, such as objects 1601, 1603, 1605. The compiler-generated version of the function is shown at 1600'. At 1610, a new exception registration record is declared. At 1611, the then-current destructor count is stored in the exception registration record. At 1612 the frame for this function is hooked into the exception handler chain. Then, at 1613, the current context is set for this block (which has objects 1601, 1603, 1605). The body of the function is shown at 1615. There, no code whatsoever has been added to the function body for exception handling cleanup. Instead, the code has been added at the constructor and at the destructor (as previously described).

Suppose, for example, that upon entry into the function 1600, the then-current destructor count was equal to 5. Suppose further that the first two variables (var1 and var2) have been constructed but the executing code throws an exception. The runtime exception handling library may determine from the change of the destructor count (from 5 to 7) that two objects require cleanup. The system may then reference the cleanup table, which has one entry for each object which requires destruction. The system simply destroys the top two. Instructions 1618 simply illustrate that the destructor count is decremented when the objects are destroyed.

Figure 17:
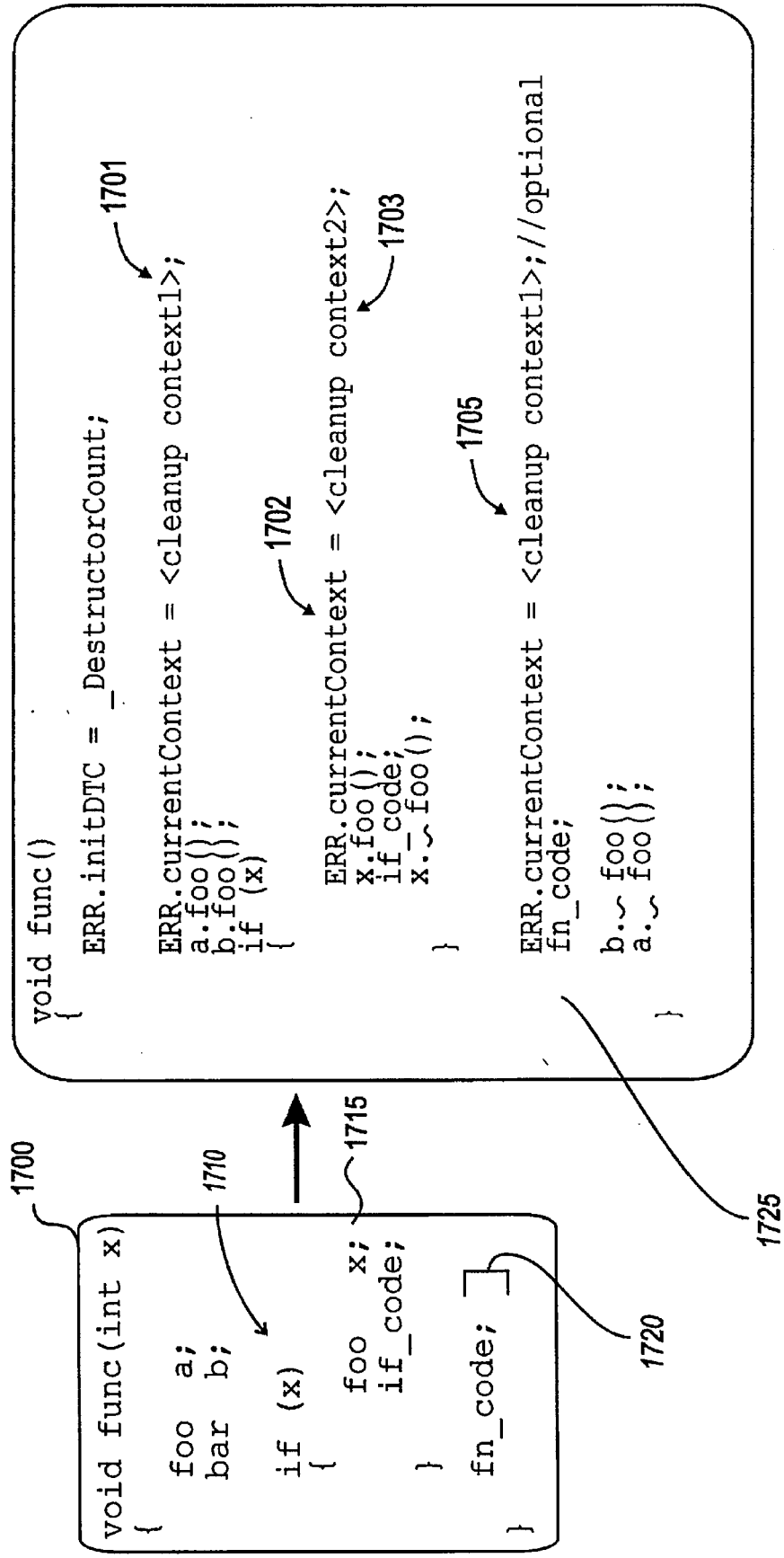
FIG. 17 is a diagram illustrating code translation of source listing having a nested block, with destructor cleanup.

FIG. 17 illustrates an example of a function having two destructor cleanup blocks. Any nested block, such as nested block 1710 which has a local variable, such as variable 1715, will get a separate entry in the context table and a separate table of variables. As the first block is entered, the context is set to 1 (at 1701). If the nested block 1702 is entered (i.e., the "if" statement evaluates to TRUE) then the current context is set to context 2, at 1703. When the nested block 1702 is exited, the current context is reset to context 1, at 1705. Note, however, that if the remaining code (i.e., that between the nested block and the end of the function) does not declare any new objects or variables, then the current context does not need to be reset to context 1 at 1705. Thus, the assignment to restore the current context (at 1705) is deferred as late as possible (up to the declaration of new local variables) so that the system may determine whether the assignment may be voided completely.

Figure 18:
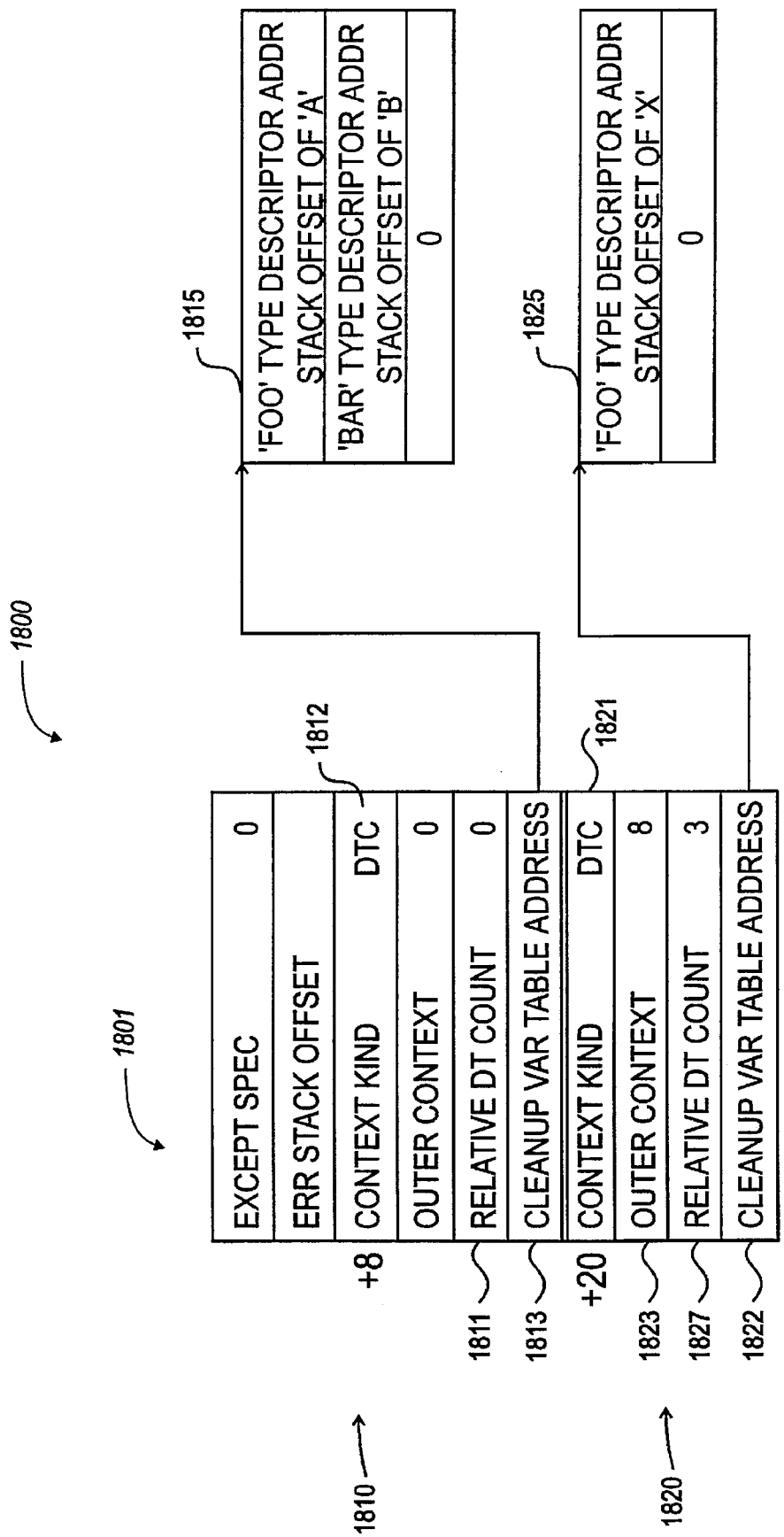
FIG. 18 is a block diagram illustrating the relationship between context table records and the destructor cleanup object tables.

Referring now to FIG. 18, the layout of context table entries for the foregoing example will be described. The context table has two entries for these regions: entries 1810 and 1820. The former entry corresponds to the outermost block; the latter entry corresponds to the innermost block (i.e., the "if" block). For the outermost block, the relative destructor count is zero (shown at 1811), because this is the beginning of the function—there is no outer context. Next, the type or kind of context is Destructor Cleanup (DTC) shown at 1812. As shown at 1813, the cleanup table has two entries for a and b, which are the two variables or objects declared in the function. In a corresponding manner, the context entry 1820 for the nested block includes a context type or kind set to Destructor Cleanup (DTC), shown at 1821. At 1822, the entry points to its variable table entry 1825 which comprises a single entry (for the single variable or object x). The outer context field 1823 is equal to the value of 8, because the block is nested within another block (i.e., it is a nested "if" block). The relative destructor count, field 1827, stores the value of 3, which results from foo incrementing the destructor count by 1 and bar incrementing the destructor count by 2. Bar increments by 2 because bar is a derived class of foo (i.e., bar has a foo in it). In this fashion, when the relative destructor count is computed, the value of 3 is subtracted to determine the correct number (of entries in the destructor cleanup table to destroy).

4. New/Delete Expressions

New and delete expressions require special handling, requiring under certain circumstances, for instance, that the memory allocated for the object be freed up (using the appropriate operator delete). For this reason, new/delete expressions get assigned their own context, which is appropriately marked (as new or delete).

The evaluation of new and delete expressions should also preserve the destructor count value. This is much easier with new expressions, where the type of the object is known at compile time; thus, the compiler generates code that decrements the destructor count by the appropriate amount right after the constructor gets called. For example, the expression p = new foo is transformed into the following:

```
temp = operator new(sizeof(foo));
if    (temp)
{
      <set current EH context to 'new' region>
      temp->foo();        // call the constructor
      _DestructorCount -= DTC(foo);
      <set current EH context to outer region>
}
temp is the result
```

For delete expressions the situation is more complex. First, the destructor count should be adjusted before calling the destructor, so that proper cleanup can be guaranteed (including that of the surrounding regions). Moreover, for a class that has a virtual destructor, the "real" type of the object cannot be determined at compile time. Therefore, code is generated that will, at runtime, get the destructor count adjustment for the "real" object (from the RTTI descriptor which is pointed to from the virtual table). Thus, the expression delete p will become the following (assuming a virtual destructor):

```
if   (p)
{
     temp = p;             // always store pointer value in memory
     _DestructorCount += _GetPolymorphicDTC(temp->vtablePtr);
     <set current EH context to 'delete' region>
     temp->~foo();         // call the destructor
     <set current EH context to outer region>
}
```

One should note that as an alternative, a flag could be passed to all virtual destructors, indicating whether they need to adjust the destructor count; this would simplify the code generated for delete expressions, but would add overhead to the bodies of all virtual destructors.

5. DLL and Multiple-Thread Implications

In order to support shared libraries (e.g., DLLs) and multiple threads, care should be taken whenever global variables are used at runtime. This applies to the destructor count variable (which is used for C++ destructor cleanup), as well as any global variables used in the runtime library to implement exception handling.

In order to correctly handle cases where stack frames and constructor/destructor bodies may live in multiple DLL's, it is essential for a program to have single copies (shared by all the components) of the many global variables used by the exception handling runtime (most prominently, there needs to be a single copy of the destructor count variable).

Since the destructor count is the only global variable that is frequently accessed in code generated by the compiler for user modules (this variable being modified in most constructors and destructors), access to this variable should be efficient. This precludes using, for example, the OS/2 and Win32 APIs that support per-thread storage (since every access would involve a function call). In the absence of multiple threads, globals can be accessed directly in an executable, and via a pointer (which is initialized at startup time) in a DLL.

When dealing with 16-bit DOS and Windows programs, things are fairly simple: there are no threads, and the bottom of the stack segment is easily accessible (since the start of the SS segment is defined by the runtime library startup code). Thus, global variables related to exception handling can be stored at fixed (preferably small) offsets within the stack segment, and accessed directly through SS: overrides.

In a multi-threaded environment such as Win32 or OS/2 which maintains easily addressable per-thread information blocks, ideally one would store any per-thread exception handling variables in such a block. Under both Win32 and OS/2 this block is always in the FS: selector, but unfortunately neither OS reserves any space in this block for exception handling implementations. There are several approaches that can be used to allow reasonably efficient access to per-thread variables under Win32 and/or OS/2:

(1) TLS under Win32 may be used.

Under Win32, per-thread data can be accessed fairly efficiently via the FS:[2CH]/Tls_index approach. The problem with this technique is that it does not work for dynamically loaded DLLs, thus limiting usefulness of the approach.

(2) Global values on the stack may be allocated, and a pointer passed to all exception handling stack frames.

Basically, at the beginning of the main program, as well as when a new thread is created by the user program, a record is allocated on the stack that holds the global state maintained by the exception handling runtime. A pointer to such an area is kept in every exception registration record, and whenever a new ERR is added to the exception handler chain, the pointer value is copied from the previous ERR. The main problem with this approach is that it relies on all exception handlers belonging to the same translator (so that the pointer is always copied and is therefore available within the ERR that is at the head of the OS exception handler list). In fact, since the OS itself may on occasion insert an exception handling frame (which most likely will not copy the "hidden" pointer) when calling a user function, this scheme is too restrictive.

(3) The base of the stack may be used.

Under Win32 and OS/2 (on Intel CPUs) the base of the stack can be accessed via FS:4 and FS:8, respectively. If the exception handling variables are stored at a fixed offset from the base of the stack, they can be accessed very effectively. Of course, the OS may choose to store useful values in these locations, and thus care should be taken when choosing the placement. It is also a good idea for a programmer to save and restore the original bytes at these locations at startup and exit of the program.

This last approach is the one implemented in a preferred embodiment. Here is an example of accessing the destructor count in a multi-threaded Win32 program:

```
mov     eax,dword ptr fs:[4]
inc     dword ptr [eax-4]
```

This assumes that the destructor count resides in the first 32-bit word at the base of the CPU stack. Under OS/2, FS: [8] would be used instead of FS: [4].

The final issue is how to get an executable to install the values at the base of the stack, so that they can be used by all the DLLs the program loads. This is complicated by the fact that DLL's are initialized before the main program starts executing. Under Win32 things are fairly simple: every DLL's initialization routine finds the initialization code in the executable via the GetProcAddress function, and then calls it to set up the stack variables. Under OS/2, it is apparently not possible to locate an entry point in an executable in this fashion. Different solutions are possible for OS/2:

(4) Allocation of the first component (whether this is a DLL or the executable) that happens to be initialized to the variables on its stack is allowed.

Once the main program starts executing, it needs to substitute its own set of globals, since the first DLL to be initialized may terminate before the main program. The complicated issue is detecting that another component has already initialized the top of the stack, as well as saving and restoring the original values (since the component that initializes first may not necessarily be the one that is shut down last). One way to solve this dilemma is to utilize a shared memory area (whose name is created based on the process ID of the program, such that all of its components can access it) to indicate that the variables have been allocated. The disadvantage of this approach is that shared memory tends to incur a very significant overhead.

(5) In the DLL initialization code, the address space may be searched for a signature that is placed in the executable to mark the location of the executable's initialization routine.

The approach has a problem (apart from aesthetics). In particular, searching the address space for a signature can be relatively time-consuming, especially in the presence of base linking.

6. Implications for 16-Bit Windows (Win16)

As mentioned previously, one has to be extremely careful under Win16 to prevent exceptions from being thrown out of callback functions, past OS stack frames, and back to a higher level in the application. This is required since Windows needs to maintain some bookkeeping regarding the state of messages and the application queues; bypassing Windows will result in incorrect results. Win32 applications are not subject to this problem.

In an application class library, such as Borland's OWL 2.0, all exceptions are caught on the callback side, in other words, with OS stack frames between the application and the callback function. There are several generic catch clauses which are capable of caching the relevant information in the exception. There is a catch clause which catches all other exceptions, and caches the fact that one does not know what kind of exception it is. Any exception which is caught here is suspended through a SuspendThrow member function, and the dispatcher returns to Windows gracefully. Once one has returned from the callback function, the exception is reconstructed and rethrown manually.

A function for receiving all callbacks and dispatching them is shown below, it has been modified to show the relevant portions.

```
LRESULT
TWindow::ReceiveMessage(UINT msg, WPARAM wParam, LPARAM lParam)
{
    /*
    /*  Your Win32 code does not need to do any of the fancy
    /*  work for re-throwing exceptions, so we let the OS handle
    /*  it for that platform.
    */
#if defined(__WIN32__)
        static BOOL IsNT = ((HIWORD(::GetVersion()) & 0x8000) == 0);
        if (IsNT)
            return HandleMessage(msg, wParam, lParam);
#endif
        try
        {
            return HandleMessage(msg, wParam, lParam);
        }
        /*
        /*  Here is the list of exceptions that we know about.
        These can be
        /*      saved and reconstructed faithfully later. All other
        exceptions
            /* we use a catch (...) clause for.
```

```
            */
            catch (TXOwl& x)
            {
                    Get Application() - >SuspendThrow (x);
            }
            catch ((xalloc& x)
            {
                    Get Application() - >SuspendThrow (x);
            }
                    catch (xmsg& x)
            {
                    GetApplication() ->SuspendThrow(x);
            }
            catch (Bad_cast)
            {
                    GetApplication() ->SuspendThrow(TApplication::xsBadCast);
            }
            catch (Bad_typeid)
            {
                    GetApplication() ->SuspendThrow(TApplication::xsBadTypeid);
            }
            /*
            /*   For all other exceptions, we just log an unknown exception.
            */
            catch (...)
            {
                    GetApplication() ->SuspendThrow(TApplication::xsUnknown);
            }
            // Default value returned when exception caught:
            return msg == WM_CREATE ? -1 : 0;
}
```

The suspend functions cache only the important information from the exceptions in some static regions, and flag that an exception was, indeed, caught.

```
void
TApplication::SuspendThrow(xalloc& x)
{
        XString     = x.why();
        XSize       = x.requested();
        xState     |= xsAlloc;
}
void
TApplication::SuspendThrow(xmsg& x)
{
        XString     = x.why();
        XState     |= xsMsg;
}
void
TApplication::SuspendThrow(TXOwl& x)
{
        delete Xowl;          // remove any previous exception
        XOwl = x.Clone();
        XState |= xsOwl;
}
void
TApplication::SuspendThrow(int flag)
{
        XState |= (flag & (xsBadCast | xsBadTypeid | xsUnknown));
}
```

Once the user returns to the application, he or she should check to see if there are any outstanding exceptions that were suspended. If there was an exception, it will be reconstructed and thrown. For unknown types of exceptions, a string is thrown.

```
void   TApplication::ResumeThrow()
{
        if  (Xstate)    // Was any exception thrown?
            {
```

```
            if   (XState & xsAlloc)
            {
                    XState &= ~xsAlloc;
                    throw (xalloc(XString,XSize));
            }
            if   (XState & xsMsg)
            {
                    XState &= ~xsMsg;
                    throw (xmsg(XString));
            }
            if   (XState & xsUnknown)
            {
                    XState &= ~xsUnknown;
                    throw (xmsg(string()));
            }
            if   (XState & xsBadCast)
            \   {
                    XState &= ~xsBadCast;
                    throw (Bad_cast()),
            }
            if   (XState & xsBadTypeid)
            {
                    XState &= ~xsBadTypeid;
                    throw (Bad_typeid());
            }
            if   (XState & xsOwl)
            {
                    XState &= ~xsOwl;
                    XOwl->Throw();     // must be deleted later
            }
       }
}
```

In order to make sure that all of the above code works, one should be sure that everytime a Windows function is called which could result in a callback to the class library (e.g., OWL), throwing exceptions after the call is resumed. The exceptions will always have been caught by the class library, since the callback functions are all dispatched at a low level in the class library, and the dispatch code is protected as shown above. For example:

```
LRESULT
TWindow::Sendmessage(UINT msg, WPARAM wParam, LPARAM lParam)
{
    /*
    /*  Call Windows.  Exceptions will be caught by the OWL callback
    /*  functions for this window.
    */
    LRESULT    result = ::SendMessage(HWindow, msg, wParam, lParam);
    /*
    /*  Make sure that we rethrow any exceptions that may have been
    /*  thrown while we were in SendMessage:
    */
    GetApplication() ->ResumeThrow();
    return result;
}
```

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

Source Code Appendix A

C example

```
void  g(int);
int   x(unsigned long);

void  f(void)
{
        __try
        {
                g(1);
        }
        __except(x(__exception_code))
        {
                g(2);
        }

__try
        {
                g(3);
        }
        __finally
        {
                g(4);

if      (__abnormal_termination)
                        g(5);

g(6);
        }
}

_f      proc    near
                ;
                ;  void  f(void)
                ;
                push    ebp
                mov     ebp,esp
                sub     esp,32
```

;Initialize the ERR (in particular, set the abnormal_termination flag's value ;to 0), and hook it into the OS exception handling chain.

```
                mov     dword ptr [ebp-28],offset __ExceptionHandler
                mov     dword ptr [ebp-20],esp
                mov     dword ptr [ebp-24],offset context_table
                mov     word ptr [ebp-14],0 mov     eax,dword ptr fs:[0]
                mov     dword ptr [ebp-32],eax
                lea     eax,byte ptr [ebp-32]
                mov     dword ptr fs:[0],eax ;
                ;  {
                ;            __try
                ;
```

;Assigns a value to the current context offset to indicate that the try/except ;block is now executing. The entry for this try block is at offset 8 in the ;context table.

```
                mov     word ptr [ebp-16],8
                ;
```

```
                                    67
             ;             {
             ;                       g(1);
             ;
                  push  1
                  call  near ptr _g
                  add   esp,4
             ;
             ;                       }
             ;

;Resets the current context value back to 0 to indicate that the try
     block has ;been completed.

mov   word ptr [ebp-16],0
                  jmp   short @9
```

The following section of code provides the function called by the runtime library to compute the filter value. Note how the value of *exception_code* is loaded by the compiler directly from the ERR.

```
            except_filtx:
             ;
             ;              __except(x(__exception_code))
             ;
                  push  dword ptr [ebp-12]
                  call  near ptr _x
                  add   esp,4
                  ret
             ;
             ;                       {
             ;
```

The body of the __except block follows.

```
            except_block:
             ;
             ;                       g(2);
             ;
                  push  2
                  call  near ptr _g
                  add   esp,4
             ;
             ;                       }
             ;

@9:
             ;
             ;              __try
             ;
```

Set the current context for the second __try block.

```
                  mov   word ptr [ebp-16],20
             ;
             ;                       {
             ;                               g(3);
             ;
                  push  3
```

```
                                68
              call    near ptr _g
              add     esp,4
          ;
          ;           }
          ;
```

Reset context value, as we are leaving the __try block. Execution now simply flows into the __finally block (remember that the function prolog has set the abnormal_termination flag to 0). Note again how the reference to the abnormal_termination flag in the code turns into a reference to the apropriate member of the ERR.

```
              mov     word ptr [ebp-16],0
          ;
          ;           __finally
          ;           {
          ;               g(4);
          ;
    finally_block:

push    4
              call    near ptr _g
              add     esp,4
          ;
          ;               if   (__abnormal_termination)
          ;
              cmp     word ptr [ebp-14],0
              je      short @12
          ;
          ;                   g(5);
          ;
              push    5
              call    near ptr _g
              add     esp,4
    @12:
          ;
          ;
          ;               g(6);
          ;
              push    6
              call    near ptr _g
              add     esp,4
          ;
          ;           }
          ;
```

When the __finally body has finished execution, the abnormal_termination flag is tested. If non-zero, a return is executed (this will only happen when the runtime library has invoked the finally body via a call instruction). Otherwise, it falls through the rest of the code continues.

```
              cmp     word ptr [ebp-14],0
              je      short @14
              ret
    @14:
```

Unhook the function's ERR from the OS exception chain before returning.

```
              mov     eax,dword ptr [ebp-32]
              mov     dword ptr fs:[0],eax
```

```
                                                        69
                    leave
                    ret _f      endp
```

This is the context table for the function. There is no exception specification, thus the first entry is zero. The second entry gives the EBP (Extended Base Pointer register) offset of the registration record; this allows the runtime library to reconstruct the appropriate value of EBP for the function. The context table contains two entries.

```
            context_table   label dword dd      0                   ; exception-specification list
            (=none)
                    dd      -32                 ; stack offset of exception record dw      0                   ; outer context offset (=none)
                    dw      1                   ; context type (__try/__except)
                    dd      except_filtx        ; address of filter expression
            code
                    dd      except_block        ; address of __except block dw      0                   ; outer context offset (=none)
                    dw      0                   ; context type (__try/__finally)
                    dd      0                   ; unused
                    dd      finally_block       ; address of __finally block
```

C++ try/catch example

```
int     g(int x);

int     f(int x)
{
        g(1);

try
        {
                g(2);

if      (x > 0)
                        goto LABEL;

if      (x < 0)
                        return  1;

g(3);
        }
        catch(int a)
        {
                g(a+1);

if      (a)
                        return  a;

g(a-1);
        }
        catch(...)
        {
                g(5);

if      (x)
                        goto LABEL;

g(6);
```

```
                    }
        LABEL:
                g(9);
                return    0;
        }

@f$qi proc   near
                ;
                ; int    f(int x)
                ;
                push     ebp
                mov      ebp,esp
                sub      esp,48

Initialize the ERR, and hook it into the OS exception handling chain.

mov      dword ptr [ebp-28],offset __ExceptionHandler
                mov      dword ptr [ebp-20],esp
                mov      dword ptr [ebp-24],offset context_table
                mov      word ptr [ebp-16],0 mov      edx,dword ptr fs:[0]
                mov      dword ptr [ebp-32],edx
                lea      eax,byte ptr [ebp-32]
                mov      dword ptr fs:[0],eax
                ;
                ; {
                ;
                ;        g(1);
                ;
                push     1
                call     near ptr @g$qi
                add      esp,4
                ;
                ;
                ;        try
                ;

Assigns a value to the current context offset to indicate that the
        try/catch block is now executing. The entry for this try block is at
        offset 8 in the context table.

mov      word ptr [ebp-16],8
                ;
                ;      {
                ;             g(2);
                ;
                push     2
                call     near ptr @g$qi
                add      esp,4
                mov      ecx,dword ptr [ebp+8]
                ;
                ;
                ;             if    (x > 0)
                ;
                test     ecx,ecx
                jle      short @9
                ;
                ;                    goto LABEL;
                ;

When a goto is used to exit the try block, the current context value
        should be adjusted to reflect the context of the target label.
```

```
                                    71
                       mov    word ptr [ebp-16],0
                       jmp    near ptr @19
              @9:
              ;
              ;
              ;              if    (x < 0)
              ;
                       test   ecx,ecx
                       jge    short @11
              ;
              ;                         return    1;
              ;
```

When the try block is exited via a return statement, the function's frame should be unhooked from the OS exception chain before returning.

```
                       mov    eax,dword ptr [ebp-32]
                       mov    dword ptr fs:[0],eax
                       mov    eax,1
                       jmp    near ptr @21

@11:

;
              ;
              ;              g(3);
              ;
                       push   3
                       call   near ptr @g$qi
                       add    esp,4
              ;
              ;              }
              ;
```

Reset the current context value to 0 to indicate that the try block has been completed.

```
                       mov    word ptr [ebp-16],0
                       jmp    short @19
              ;
              ;              catch(int a)
              ;
```

The following label marks the body of the first catch handler.

```
              catch_1:

;
              ;              {
              ;                    g(a+1);
              ;
                       mov    eax,dword ptr [ebp-36]
                       mov    dword ptr [ebp-40],eax
                       mov    eax,dword ptr [ebp-40]
                       inc    eax
                       push   eax
                       call   near ptr @g$qi
                       add    esp,4
              ;
              ;
              ;              if    (a)
              ;
                       cmp    dword ptr [ebp-36],0
                       je     short @14
              ;
```

```
;                    return       a;
;
```

Since cleanup is required for a handled exception, when the catch block is exited via a return statement, the __Return_unwind function is called to accomplish the cleanup.

```
        mov     eax,dword ptr [ebp-40]
        mov     dword ptr [ebp-44],eax lea     edx,byte ptr [ebp-32]
        push    edx
        call    near ptr __Return_unwind
        add     esp,4 mov     eax,dword ptr [ebp-44]
        jmp     short @21

@14:
        ;
        ;
        ;              g(a-1);
        ;
        mov     eax,dword ptr [ebp-40]
        dec     eax
        push    eax
        call    near ptr @g$qi
        add     esp,4
        ;
        ;              }
        ;
```

When the closing } of each catch clauses is reached, control is transferred to the cleanup call below.

```
        jmp     short @18
        ;
        ;       catch(...)
        ;
catch_2:
        ;
        ;       {
        ;              g(5);
        ;
        push    5
        call    near ptr @g$qi
        add     esp,4
        ;
        ;
        ;              if     (x)
        ;
        cmp     dword ptr [ebp+8],0
        je      short @17 push    0
        lea     eax,byte ptr [ebp-32]
        push    eax
        call    near ptr __Local_unwind
        add     esp,8
        ;
        ;                      goto LABEL;
        ;
        jmp     short @19
```

73

```
@17:
        ;
        ;
        ;               g(6);
        ;
        push    6
        call    near ptr @g$qi
        add     esp,4
```

The following call makes sure the run-time library is informed that the exception has been handled.

```
@18:

;
        ;           }
        ;
        call    near ptr @_CatchCleanup$qv

@19:

;
        ;
        ;   LABEL:
        ;
        ;           g(9);
        ;
        push    9
        call    near ptr @g$qi
        add     esp,4
        ;
        ;
        ;           return  0;
        ;
```

Unhook the function's ERR from the OS exception chain.

```
        mov     eax,dword ptr [ebp-32]
        mov     dword ptr fs:[0],eax xor     eax,eax @21:
        leave
        ret @f$qi endp
```

The context table for the function is as follows

```
context_table   label dword dd      0       ; exception-specification list (=none)
        dd      -32     ; stack offset of exception record
```

The first context of the table corresponds to the try block (it points off to the catch table). It is immediately followed by the context used for all of the catch blocks.

```
                                74
                dw      0               ; outer context offset (=none)
                dw      3               ; type of context (try/catch)
                dd      catch_table     ; address of catch handler table dw      0               ; outer context offset (=none)
                dw      4               ; type of context (catch part of
        try)

The catch table follows.
                catch_table label dword dd      -36             ; stack offset of catch argument
                dd      4               ; maximum size of catch argument dd      catch_1         ; catch label
                dd      __tpdsc__[int]  ; type of argument (int)
                dd      0               ; flags
                dd      0               ; copy-ctor address
                dd      0               ; copy-ctor calling convention dd      catch_2         ; catch label
                dd      0               ; type of argument (...)
                dd      0
                dd      0
                dd      0 dd      0               ; end of table
```

Destructor cleanup examples

```
struct      B
{
        B();
        B(const B&);
        ~B();

int     b;
};
struct      D:B
{
        D();
        D(const D&);
        ~D();

int     d;
};

int     g(int);

void    f(void)
{
        D       a;
        g(1);
        D       b;
        g(2);
        D       c;
        if      (g(11))
        {
                D       nest1;
                D       nest2;
                g(12);
        }
        g(3);
```

```
                                75
              D      d;
              g(4);
        }

@f$qv   proc    near
                ;
                ;   void   f(void)
                ;
                        push    ebp
                        mov     ebp,esp
                        sub     esp,92
                        push    ebx
                        push    edi
                        push    esi mov     dword ptr [ebp-28],offset __ExceptionHandler
                        mov     dword ptr [ebp-20],esp
                        mov     dword ptr [ebp-24],offset context_table ;Save the destructor count value on entry to the function in the ERR.

mov     eax,large dword ptr __DestructorCountPtr
                        mov     eax,dword ptr [eax]
                        mov     dword ptr [ebp-4],eax ;Hook our ERR into the OS handler chain.

lea     eax,byte ptr [ebp-32]
                        mov     edx,dword ptr fs:[0]
                        mov     dword ptr [ebp-32],edx
                        lea     eax,byte ptr [ebp-32]
                        mov     dword ptr fs:[0],eax
                ;
                ;   {
                ;
```

The first destructor cleanup context (which corresponds to the outermost function block) is entered here. The offset of that entry within the context table is 8. There is no additional overhead for any of the local variable declarations in that function block, with the single exception of this one mov instruction (the other mov added a few lines below is present only because of the nested block and the local declaration that follows it).

```
                        mov     word ptr [ebp-16],8
                ;
                ;       D      a;
                ;
                        lea     edi,byte ptr [ebp-40]
                        push    edi
                        call    near ptr @D@$bctr$qv
                        add     esp,4
                ;
                ;
                ;       g(1);
                ;
                        push    1
```

```
                                    76
                    call    near ptr @g$qi
                    add     esp,4
            ;
            ;
            ;           D       b;
            ;
                    lea     esi,byte ptr [ebp-48]
                    push    esi
                    call    near ptr @D@$bctr$qv
                    add     esp,4
            ;
            ;
            ;           g(2);
            ;
                    push    2
                    call    near ptr @g$qi
                    add     esp,4
            ;
            ;
            ;           D       c;
            ;
                    lea     ebx,byte ptr [ebp-56]
                    push    ebx
                    call    near ptr @D@$bctr$qv
                    add     esp,4
            ;
            ;
            ;           if      (g(11))
            ;
                    push    11
                    call    near ptr @g$qi
                    add     esp,4
                    test    eax,eax
                    je      short @10
            ;
            ;           {
            ;
```

The nested block's context is entered. Upon exiting this nested block below, the current context is not immediately reset to the outer block, as this is not necessary until the next object declaration is reached (the context is set just before the constructor for that object is called). Without this additional local object declaration, it would not be necessary to set the context upon exit from the nested block.

```
                    mov     word ptr [ebp-16],20
            ;
            ;           D       nest1;
            ;
                    lea     ecx,byte ptr [ebp-64]
                    push    ecx
                    mov     dword ptr [ebp-68],ecx
                    call    near ptr @D@$bctr$qv
                    add     esp,4
            ;
            ;           D       nest2;
            ;
                    lea     eax,byte ptr [ebp-76]
```

```
                          77
                 push    eax
                 mov     dword ptr [ebp-80],eax
                 call    near ptr @D@$bctr$qv
                 add     esp,4
  5         ;
            ;
            ;                  g(12);
            ;
                 push    12
 10              call    near ptr @g$qi
                 add     esp,4
            ;
            ;                  }
            ;
 15              push    2
                 push    dword ptr [ebp-80]
                 call    near ptr @D@$bdtr$qv
                 add     esp,8
                 push    2
 20              push    dword ptr [ebp-68]
                 call    near ptr @D@$bdtr$qv
                 add     esp,8

@10:
 25
            ;
            ;
            ;           g(3);
            ;
 30              push    3
                 call    near ptr @g$qi
                 add     esp,4
            ;
            ;
 35         ;           D       d;
            ;
                 mov     word ptr [ebp-16],8

;need to set the current context to the correct block before
 40    constructing the ;following local variable.

lea     eax,byte ptr [ebp-88]
                 push    eax
                 mov     dword ptr [ebp-92],eax
 45              call    near ptr @D@$bctr$qv
                 add     esp,4
            ;
            ;
            ;           g(4);
 50         ;
                 push    4
                 call    near ptr @g$qi
                 add     esp,4
                 push    2
 55              push    dword ptr [ebp-92]
                 call    near ptr @D@$bdtr$qv
                 add     esp,8
                 push    2
                 push    ebx
 60              call    near ptr @D@$bdtr$qv
                 add     esp,8
                 push    2
                 push    esi
                 call    near ptr @D@$bdtr$qv
 65              add     esp,8
                 push    2
                 push    edi
```

```
                    call    near ptr @D@$bdtr$qv
                    add     esp,8

;Remove our ERR from the OS handler chain.

mov     eax,dword ptr [ebp-32]
                    mov     dword ptr fs:[0],eax pop     esi
                    pop     edi
                    pop     ebx
                    leave
                    ret @f$qv endp
```

The context table contains the two nested cleanup contexts. These point off into the cleanup variable tables, which have entries for all of the local variables declared in the function:

```
        context_table   label dword dd      0                   ; exception-specification list
(=none)
                dd      -32                 ; stack offset of exception record dw      0                   ; outer context offset (=none)
                dw      5                   ; context type (dtor cleanup)
                dd      0                   ; entry destructor count
                dd      dt_outer            ; table of variables dw      8                   ; outer context offset
                dw      5                   ; context type (dtor cleanup)
                dd      6                   ; entry destructor count
                dd      dt_inner            ; table of variables
```

The variable destructor cleanup table contains entries for all of the local variables in both of the nested blocks:

```
        dtcvar_table    label dword dt_outer:

dd      __tpdsc__[D]        ; type of variable is 'D'
                dd      4                   ; flags
                dd      -40                 ; stack offset of variable dd      __tpdsc__[D]        ; type of variable is 'D'
                dd      4                   ; flags
                dd      -48                 ; stack offset of variable dd      __tpdsc__[D]        ; type of variable is 'D'
                dd      4                   ; flags
                dd      -56                 ; stack offset of variable dd      __tpdsc__[D]        ; type of variable is 'D'
                dd      4                   ; flags
                dd      -88                 ; stack offset of variable dd      0                   ; end of table for outer block
```

79

```
dt_inner:
        dd      __tpdsc__[D]            ; type of variable is 'D'
        dd      4                       ; flags
        dd      -64                     ; stack offset of variable dd      __tpdsc__[D]            ; type of variable is 'D'
        dd      4                       ; flags
        dd      -76                     ; stack offset of variable dd      0                       ; end of table for inner block
```

The following is an example of *new/delete* cleanup code.

```
struct      B
{
    B();
    B(const B&);
virtual~B();
    int     b;
};

struct      D:B
{
    D();
    D(const D&);
    ~D();
    int     d;
};

int     g(int);

void    f(void)
{
    g(1);

B   * p = new D;

g(2);

delete      p;

g(3);
}

@f$qv proc   near
        ;
        ; void  f(void)
        ;
        push    ebp
        mov     ebp,esp
        sub     esp,48
        push    ebx
        push    edi
        push    esi mov     dword ptr [ebp-28],offset __ExceptionHandler
        mov     dword ptr [ebp-20],esp
        mov     dword ptr [ebp-24],offset context_table
        mov     word ptr [ebp-16],0
```

80

Save the destructor count value on entry to the function in the ERR.

```
            mov     eax,large dword ptr __DestructorCountPtr
            mov     eax,dword ptr [eax]
            mov     dword ptr [ebp-4],eax mov     edx,dword ptr fs:[0]
            mov     dword ptr [ebp-32],edx
            lea     eax,byte ptr [ebp-32]
            mov     dword ptr fs:[0],eax
        ;
        ;   {
        ;           g(1);
        ;
            push    1
            call    near ptr @g$qi
            add     esp,4
        ;
        ;       B   * p = new D;
        ;
```

First, the memory for the object being allocated is obtained by calling operator new.

```
            push    12
            call    near ptr @$bnew$qui
            add     esp,4
            mov     dword ptr [ebp-36],eax  ; store ptr in stack
```

Skip the following code if the operator new call returned NULL.

```
            test    eax, eax
            je      short @11
```

Next, the new context is entered by setting the current context to 20.

```
            mov     word ptr [ebp-16],20 push    eax
            call    near ptr @D@$bctr$qv
            add     esp,4
```

The destructor count is decremented to preserve its value (since the constructor call above just incremented the count by 2).

```
            mov     eax,large dword ptr __DestructorCountPtr
            sub     dword ptr [eax], 2
```

Finally, the new context is exited by resetting the current context value back to the containg block.

```
                                81
              mov    word ptr [ebp-16],8
      @11:
              mov    esi,dword ptr [ebp-36]
              ;
              ;         g(2);
              ;
              push   2
              call   near ptr @g$qi
              add    esp,4
              ;
              ;         delete    p;
              ;
```

To check to see if the NULL pointer is being deleted:

```
              mov    edi,esi
              test   esi,esi
              je     short @14
```

The pointer value is stored in memory, so that the runtime library can get to it.

```
              mov    dword ptr [ebp-48],edi  ; store ptr in stack
```

The destructor count is adjusted before calling the destructor so that its value is the same as if the object had just been constructed. As the class has a virtual destructor, the adjustment value should be determined at runtime by calling a helper function.

```
              push   0
              push   esi
              call   near ptr @__GetPolymorphicDTC$qpvui
              add    esp,8
              mov    edx,large dword ptr __DestructorCountPtr
              add    dword ptr [edx],eax
```

The delete context is entered next and the destructor is called.

```
              mov    word ptr [ebp-16],44
              mov    edi,dword ptr [ebp-48]
              mov    eax,dword ptr [edi]
              mov    ebx,dword ptr [eax]
              push   3
              push   edi
              call   ebx
              add    esp,8
```

The delete expression is done, so the user may switch back to the enclosing context.

```
                                82
          mov    word ptr [ebp-16],32
    @14:
          ;
          ;      g(3);
          ;
          push   3
          call   near ptr @g$qi
          add    esp,4 mov    eax,dword ptr [ebp-32]
          mov    dword ptr fs:[0],eax pop    esi
          pop    edi
          pop    ebx
          leave
          ret
    @f$qv endp
```

The context table for the above function has three destructor cleanup contexts defined. The first one is actually empty, and is merely an artifact of how new and delete expressions are treated inside the compiler. The second entry corresponds to the new expression, and the last one to the delete expression.

```
          context_table   label dword dd    0              ; exception-specification list
          (=none)
                  dd    -32            ; stack offset of exception record dw    0              ; outer context offset (=none)
                  dw    5              ; context type (dtor cleanup)
                  dd    0              ; unused
                  dd    0              ; address of variable table (=none)

dw    8              ; outer context offset
                  dw    5              ; context type (dtor cleanup)
                  dd    0              ; unused
                  dd    dtcvar_new     ; address of variable table dw    8              ; outer context offset
                  dw    5              ; context type (dtor cleanup)
                  dd    0              ; unused
                  dd    0              ; address of variable table (=none)

dw    32             ; outer context offset
                  dw    5              ; context type (dtor cleanup)
                  dd    0              ; unused
                  dd    dtcvar_del     ; address of variable table
```

The variable cleanup tables contain the entries for the new and delete expressions. The delete entry points to a type descriptor for the type B, since that is statically the object type being deleted.

83

```
dtcvar_table      label dword dtcvar_new:
        dd      __tpdsc__[D]        ; type of variable = 'D'
        dd      8199                ; flags
        dd      -36                 ; stack offset of variable dd      0                   ; end of table
dtcvar_del:
        dd      __tpdsc__[B]        ; type of variable = 'B'
        dd      16399               ; flags
        dd      -48                 ; stack offset of variable dd      0                   ; end of table
```

Source Code Appendix B

The pseudo-code for the exception handler in the runtime library is as follows:

```
int    _ExceptionHandler(params)
{
       if    (we_are_unwinding)
       {
              // first unwind all the current contexts in the fn.
              local_unwind(err, 0);
              if     (is_C++_exception)
              {
                     if    (function_has_exception_spec)
                     {
                            if     (exception_not_in_list)
                            {
                                   unexpected();
                            }
                     }
              }
       } for   (ctx = current_context; ctx; ctx = ctx->outer)
       {
              switch      (ctx->kind)
              {
              case  XB_FINALLY:
              case  XB_CATCH:
              case  XB_DEST:

// ignore these when not unwinding break;

case  XB_TRYCPP:
                     // ignore if not a C++ exception
                     if     (!is_C++_exception)
                            break;
                     // ignore if we don't want to catch it
                     if     (!find_matching_handler)
                            break;
                     // unwind up to this particular stack frame
                     global_unwind(err);
                     // unwind any inner nested contexts
                      local_unwind(err, ctx);
                     // initialize the catch arg, if needed
                     if     (!catch_is_...)
                            initializeCatchArg();
                     // adjust current context to be the catch
                     current_context += sizeof(try_context);
                     // finally, transfer to the catch body
                     restore_regs_and_jump_to_handler();

case  XB_EXCEXP:
                     // ignore if a C++ exception if    (is_C++_exception)
                            break;
                     // setup exception info variables in ERR
                     setup_ERR_info_vars();
                     // evaluate the filter expression value
                     filterVal = invokeFilterExpr();
```

```
                                85
                    goto EXCEPT;
            case  XB_EXCCNS:
                    // ignore if a C++ exception
                    if    (is_C++_exception)
                            break;
                    // get the (constant) filter expression value
                    filterVal = ERR->constantFilterVal;
            EXCEPT:
                    // check the filter value
                    if    (filterVal < 0)
                            return      CONTINUE_EXECUTION;
                    if    (filterVal == 0)
                            break;
                    // here if the user wants the exception
                    restore_regs_and_jump_to_handler();
            }
    }
    return    CONTINUE_SEARCH;
}
```

The pseudo-code for the context unwind routine is as follows:

```
void  local_unwind(err, target_ctx)
{
    for   (ctx = current_context;
           ctx && ctx != target_ctx;
           ctx = ctx->outer)
    {
        switch     (ctx->kind)
        {
        case  XB_TRYCPP:
        case  XB_EXCEXP:
        case  XB_EXCCNS:
            // ignore these contexts when unwinding
            break;

case  XB_FINALLY:
            err->abnormal_termination = 1;
            invoke_handler_body();
            err->abnormal_termination = 0;
            break;

case  XB_CATCH:
            _CatchCleanup();
            break;

case  XB_DEST:
            // ignore context if there are no entries
            dtt = ctx->dtTable;
            if    (!dtt)
                    break;

// compute relative destructor count
            dtc = destructor_count - err->initDTC - ctx-baseDTC;

// see if there is anything to clean up
            if    (dtc <= 0)   // signed compare!
            {
                    // special case: 'new' expression
```

```
                            86
                if    (is_new_expression)
                {
                    // free up memory
                    call_oper_del();
                }

// nothing more to do here
                break;
            }

// we need to clean up 'dtc' objects
            dtor_cleanup(dtt, dtc);
        }
    }
}
```

What is claimed is:

1. In a development system for compiling source listings into program code for operating a digital computer, said digital computer having a microprocessor and a system memory, said source listings comprising data and functions operative on said data, some of said data being stored in stack-based variables which are local to a particular function, an improved method for registering an exception handler with the computer, the method comprising:

(a) allocating a portion of said system memory to be stack memory, for last-in, first-out storage of stack-based variables associated with functions; and (b) for at least one function executed during runtime operation of the program code, registering an exception handler with the computer by:

(i) storing in said stack memory all stack-based variables associated with said at least one function, and (ii) after storage of all stack-based variables associated with said at least one function, pushing an exception registration record onto said stack memory describing a particular exception handler which is to be invoked upon occurrence of any exceptions which arise during operation of said at least one function, paid exception registration record storing a pointer to a previous exception registration record registered for another function whose execution has begun but has yet to complete, wherein said exception registration record describing a particular exception handler is stored on one end of said stack memory during execution of said at least one function.

2. The method of claim 1, wherein said exception registration record describing a particular exception handler includes a function pointer to a handler function which is to be invoked upon occurrence of any exceptions which arise during operation of said at least one function.

3. The method of claim 1, wherein said exception registration record further stores context information indicating a current context for the computer during execution said at least one function.

4. The method of claim 1, wherein said context information stores an offset into a context table describing a current context for the computer during execution of said at least one function.

5. The method of claim 4, wherein said context table comprises entries describing exception handling constructs present in said at least one function.

6. The method of claim 5, wherein each said entry of said context table is referenced via a byte offset of the entry in the table, so that variable-length entries can be stored in said context table.

7. The method of claim 1, further comprising:

resetting information stored in said exception registration record by pushing a value of zero onto said stack memory.

8. The method of claim 1, wherein step (b) (ii) includes:

pushing context information onto said stack memory, said context information indicating a current context for the computer during execution of said at least one function;

pushing an address of said particular exception handler onto said stack memory; and pushing said pointer to a previous exception registration record onto said stack memory.

9. The method of claim 1, wherein in step (a) said stack memory is allocated so that said stack memory grows downward in system memory, and wherein in step (b) (ii) said exception registration record describing a particular exception handler is stored at a bottom-most portion of said stack memory during execution of said at least one function.

10. The method of claim 1, wherein in step (a) said stack memory is allocated so that said stack memory grows upward in system memory, and wherein in step (b) (i) said exception registration record describing a particular exception handler is stored at a top-most portion of said stack memory during execution of said at least one function.

11. The method of claim 1, wherein step (b) (i) includes storing in said stack memory all stack-based variables associated with said at least one function by executing a "push" machine instruction of said microprocessor for each stack-based variable associated with said at least one function.

12. The method of claim 11, wherein step (b) (ii) includes storing said exception registration record describing a particular exception handler by executing one or more "push" machine instructions of said microprocessor, so that said stack-based variables and said exception registration record describing a particular exception handler are stored on said stack memory by a sequence of "push" machine instructions.

13. The method of claim 12, further comprising:

upon completing execution of said at least one function, removing said exception registration record by executing one or more "pop" machine instructions of said microprocessor.

14. The method of claim 13, further comprising:

upon removing said exception registration record from said stack memory, removing each stack-based variable associated with said at least one function by executing a "pop" machine instruction of said microprocessor, so that said stack-based variables and said exception registration record describing a particular exception handler are removed from said stack memory by a sequence of "pop" machine instructions.

15. The method of claim 1, wherein said microprocessor includes at least one stack register for storing an address indicating a location of said stack memory where new data can be stored, and wherein step (b) (ii) includes:

storing said exception registration record describing a particular exception handler which is to be invoked upon occurrence of any exceptions which arise during operation of said at least one function, so that said at least one stack register stores an address pointing to said exception registration record describing a particular exception handler.

16. The method of claim 1, wherein step (b) (i) is performed during execution of prologue instructions for said at least one function.

17. The method of claim 15, wherein said removing step is performed during execution of epilogue instructions for said at least one function.

18. The method of claim 1, wherein said source listings include C++ source listings having C++ exception handling constructs.

19. The method of claim 1, wherein said exceptions comprise runtime errors which occur during program execution.

20. The method of claim 19, wherein said runtime errors include file input/output error.

21. The method of claim 19, wherein said runtime errors include memory access violation errors.

22. The method of claim 19, wherein said runtime errors include operations trapped as invalid by said microprocessor.

23. A system for developing compiled computer code, the system comprising:

a computer having a microprocessor and a memory, said memory including a stack memory for storing function arguments and local data;

a compiler for generating computer code from source listings, said source listings including definitions of functions some of which include exception handling constructs;

means, operably coupled to said compiler, for identifying by the system a function having an exception handling construct, said exception handling construct specifying that a particular exception handler is to be invoked upon occurrence of an exception which arises during operation of said function; and means for storing on said stack memory at a location after function arguments and local data for the function an exception registration record describing said particular exception handler, said exception registration record storing a pointer to a previous exception registration record registered for another function whose execution has begun but has yet to complete, wherein said exception registration record describing said particular exception handler resides at one end of said stack memory during execution of the function.

24. The system of claim 23, wherein said exception registration record describing said particular exception handler includes a function pointer to a handler function which is to be invoked upon occurrence of any exceptions which arise during operation of the function.

25. The system of claim 23, wherein said exception registration record stores an address of a handler routine which is to handle any exceptions which arise and context information indicating a current context for the computer during execution of the function.

26. The system of claim 23, wherein said stack memory is allocated so that said stack memory grows downward in system memory, and wherein said exception registration record describing said particular exception handler is stored at a bottom-most portion of said stack memory during execution of the function.

27. The system of claim 23, wherein said stack memory is allocated so that said stack memory grows upward in system memory, and wherein said exception registration record describing said particular exception handler is stored at a top-most portion of said stack memory during execution of the function.

28. The system of claim 23, wherein in said stack memory all function arguments and local data associated with the function are stored by executing a stack-processing machine instruction of said microprocessor.

29. The system of claim 28, wherein said microprocessor is an 80×86-compatible microprocessor and stack-processing machine instruction is a 80×86 "push" machine instruction.

30. The system of claim 28, wherein said exception registration record describing said particular exception handler is stored by executing one or more "push" machine instructions of said microprocessor, so that function arguments and local data for the function and said exception registration record describing said particular exception handler are stored on said stack memory by a sequence of "push" machine instructions.

31. The system of claim 30, further comprising:

means for removing said exception registration record upon completing execution of the function.

32. The system of claim 31, wherein said means for removing said exception registration record includes means for removing said exception registration record by executing a "pop" machine instruction of the microprocessor.

33. The system of claim 31, further comprising:

means for removing said function arguments and local data for the function by executing a "pop" machine instruction of said microprocessor, so that said function arguments and local data for the function and said exception registration record describing said particular exception handler are removed from said stack memory by a sequence of "pop" machine instructions.

34. The system of claim 23, wherein said microprocessor includes at least one stack register for storing an address indicating a location of said stack memory where new data can be stored, and wherein said exception registration record describing said particular exception handler is stored on said stack memory at a location where said at least one stack register points to said information during execution of the function.

35. The system of claim 23, wherein said source listings include C++ source listings having C++ exception handling constructs.

36. The system of claim 23, wherein said exceptions comprise runtime errors which occur during program execution.

37. In a development system for compiling source listings into a computer program for operating a digital computer, said digital computer having a microprocessor and a system memory, said source listings comprising data and code operative on said data, portions of said code having exception handling constructs, an improved method for registering an exception handler with the computer, the method comprising:

(a) allocating a portion of said system memory to be stack memory, for last-in, first-out storage of information; and (b) for a portion of code executed during runtime which includes an exception handling construct, registering an exception handler with the computer by:

(i) storing in said stack memory any stack-based variables associated with said portion of code, and (ii) after storage of said stack-based variables, storing an exception registration record describing a particular exception handler which is to be invoked upon occurrence of any exceptions which arise during operation of said portion of code, said exception registration record storing a pointer to a previous exception registration record registered for another function whose execution has begun but has yet to complete, wherein said exception registration record describing a particular exception handler is stored on one end of said stack memory during execution of said portion of code.

38. The method of claim 37, wherein said portion of code comprises a function and wherein said stack-based variables comprise data local to said function.

39. The method of claim 37, wherein said portion of code comprises only a subset of instructions taken from a function.

40. The method of claim 37, wherein said portion of code comprises only those instructions associated directly with said exception handling construct.

\* \* \* \* \*